(12) United States Patent
Tomiyama et al.

(10) Patent No.: US 12,521,387 B2
(45) Date of Patent: Jan. 13, 2026

(54) PROPHYLACTIC OR THERAPEUTIC DRUG FOR NEURODEGENERATIVE DISEASES

(71) Applicant: Medilabo RFP, Inc., Tokyo (JP)

(72) Inventors: Takami Tomiyama, Osaka (JP); Tomohiro Umeda, Osaka (JP); Toru Kumagai, Tokyo (JP)

(73) Assignee: Medilabo RFP, Inc., Tokyo (JP)

( * ) Notice: Subject to any disclaimer, the term of this patent is extended or adjusted under 35 U.S.C. 154(b) by 1073 days.

(21) Appl. No.: 17/421,686

(22) PCT Filed: Jan. 9, 2020

(86) PCT No.: PCT/JP2020/000392
§ 371 (c)(1),
(2) Date: Jul. 8, 2021

(87) PCT Pub. No.: WO2020/145331
PCT Pub. Date: Jul. 16, 2020

(65) Prior Publication Data
US 2022/0125782 A1    Apr. 28, 2022

(30) Foreign Application Priority Data
Jan. 9, 2019 (WO) .................. PCT/JP2019/000278

(51) Int. Cl.
| | | |
|---|---|---|
| A61K 31/496 | (2006.01) | |
| A23L 33/11 | (2016.01) | |
| A61K 9/00 | (2006.01) | |
| A61K 31/05 | (2006.01) | |

(52) U.S. Cl.
CPC ............ A61K 31/496 (2013.01); A23L 33/11 (2016.08); A61K 9/0043 (2013.01); A61K 31/05 (2013.01)

(58) Field of Classification Search
None
See application file for complete search history.

(56) References Cited

U.S. PATENT DOCUMENTS

| | | |
|---|---|---|
| 2006/0229265 A1 | 10/2006 | Milburn et al. |
| 2006/0276393 A1 | 12/2006 | Milburn et al. |
| 2006/0292099 A1 | 12/2006 | Milburn et al. |
| 2007/0014833 A1 | 1/2007 | Milburn et al. |
| 2007/0137808 A1 | 6/2007 | Lostocco et al. |
| 2007/0137809 A1 | 6/2007 | Dyer et al. |
| 2007/0137810 A1 | 6/2007 | Dyer et al. |
| 2007/0137811 A1 | 6/2007 | Runge et al. |
| 2007/0137813 A1 | 6/2007 | Nickel et al. |
| 2007/0144697 A1 | 6/2007 | Dyer et al. |
| 2007/0149466 A1 | 6/2007 | Milburn et al. |
| 2007/0284069 A1 | 12/2007 | Dyer et al. |
| 2007/0295464 A1 | 12/2007 | Fetner et al. |
| 2007/0295465 A1 | 12/2007 | Dyer et al. |
| 2008/0000598 A1 | 1/2008 | Dyer et al. |
| 2008/0000602 A1 | 1/2008 | Dyer et al. |
| 2008/0041543 A1 | 2/2008 | Dyer et al. |
| 2008/0073045 A1 | 3/2008 | Dyer et al. |
| 2008/0073046 A1 | 3/2008 | Dyer et al. |
| 2008/0075671 A1 | 3/2008 | Di Mauro |
| 2008/0076821 A1 | 3/2008 | Di Mauro |
| 2008/0216977 A1 | 9/2008 | Dyer et al. |
| 2009/0087385 A1 | 4/2009 | Di Mauro |
| 2009/0325963 A1 | 12/2009 | Lilienfeld et al. |
| 2009/0326275 A1 | 12/2009 | DiMauro |
| 2010/0087527 A1 | 4/2010 | DiMauro |
| 2010/0212849 A1 | 8/2010 | Smith et al. |
| 2010/0292512 A1 | 11/2010 | DiMauro |
| 2011/0111014 A1 | 5/2011 | Langston |
| 2011/0129645 A1 | 6/2011 | Dyer et al. |
| 2011/0257587 A1 | 10/2011 | Lilienfeld et al. |
| 2012/0058088 A1 | 3/2012 | Sardi |
| 2012/0165412 A1* | 6/2012 | van der Beek ........ A61K 31/05 568/729 |
| 2013/0029996 A1 | 1/2013 | Burcelin et al. |
| 2013/0150628 A1 | 6/2013 | DiMauro |
| 2014/0011889 A1 | 1/2014 | Sardi |
| 2014/0163116 A1 | 6/2014 | DiMauro |
| 2015/0175645 A1 | 6/2015 | Milburn et al. |
| 2016/0374960 A1 | 12/2016 | DiMauro |
| 2017/0224637 A1 | 8/2017 | DiMauro |

FOREIGN PATENT DOCUMENTS

| | | |
|---|---|---|
| JP | 2008-527002 A | 7/2008 |
| JP | 2010-524959 A | 7/2010 |
| JP | 2013-518034 A | 5/2013 |
| KR | 10-2013-0048768 A | 5/2013 |

(Continued)

OTHER PUBLICATIONS

English translation of WO-2011130817 (2011).*
Trotta et al. (European Journal of Pharmaceutics and Biopharmaceutics 127: 250-259, 2018).*
English Translation of International Search Report in PCT/JP2020/000392 mailed Feb. 18, 2020.
Tomiyama, Takami, et al. "Inhibition of amyloid β protein aggregation and neurotoxicity by rifampicin. Its possible function as a hydroxyl radical scavenger.",J. Biol Chem, 1996, vol. 271, p. 6839-6844.
Yu, Wei, et al., "Cellular and Molecular Effects of Resveratrol in Health and Disease," J Cell Biochem, 2012, 113, p. 752-759.
Tredic G et al., "Resveratrol, map kinases and neuronal cells: might wine be a neuroprotectant?", Drugs Exp Clin Res, 1999, 25, p. 99-103.

(Continued)

*Primary Examiner* — Bong-Sook Baek
(74) *Attorney, Agent, or Firm* — Knobbe, Martens, Olson & Bear, LLP

(57) ABSTRACT

A technique of administering rifampicin over an extended period of time, with reduced side effects. A medicine that is for nasal administration and is used to prevent or treat neurodegenerative diseases, contains a rifampicin selected from the group consisting of rifampicin, derivatives thereof, and salts thereof, and a resveratrol selected from resveratrol and derivatives thereof, has reduced side effects, and can be administered over an extended period of time.

2 Claims, 13 Drawing Sheets

(56) References Cited

FOREIGN PATENT DOCUMENTS

| WO | WO-2011130817 A1 * | 10/2011 | ............. A61K 31/05 |
| WO | WO 2012/054936 A1 | 4/2012 | |

OTHER PUBLICATIONS

Turner, R. Scott, et al., "A randomized, double-blind, placebo-controlled trial of resveratrol for Alzheimer disease", Neurology, 2015;85;1383-1391.
Brown, VA. et al., "Repeat dose study of the cancer chemopreventive agent resveratrol in healthy volunteers: safety, pharmacokinetics, and effect on the insulin-like growth factor axis", Cancer Research, 2010, 70, p. 9003-9011.
Edwards, JA et al., "Safety of resveratrol with examples for high purity, trans-resveratrol, resVida®", Ann N Y Acad Sci., 2011, 1215, p. 131-137.
Popat R et al., A phase 2 study of SRT501 (resveratrol) with bortezomib for patients with relapsed and or refractory multiple myeloma, Br J Haematology, 2013, 160, p. 714-717.
Umeda, Tomohiro, et al., "Nasal rifampicin-Prevention of dementia by a new administration route of refampicin," Dementia Japan, vol. 32, No. 3, Sep. 15, 2018, p. 442.
Tomiyama, Takami, "3. Search for the antidementia drug by drug repositioning," Experimental medicine, 2017, vol. 35, No. 12, pp. 233-239.
Nicoletti, Natalia F. et al., "Protective effects of resveratrol on hepatotoxicity induced by isoniazid and rifampicin via SIRT1 modulation," J Nat Prod, 2014, vol. 77, pp. 2190-2195.
Adelina, Maria J.A. et al., "Medical plant extracts and natural compounds with a hepatoprotective effect against damage caused by antitubercular drugs: A review," Asian Pac J Trop Med, 2016, vol. 9, No. 12, pp. 1141-1149.
Umeda, Tomohiro, et al., "Intranasal rifalllpicin for Alzheimer's disease prevention," Alzheimer's & Dementia, 2018, vol. 4, pp. 304-313.
Extended European Search Report in European Patent Application No. 20738553.5 issued Jun. 27, 2022.
Domitrovic, Robert, et al., "A comprehensive overview of hepatoprotective natural compounds: mechanism of action and clinical perspectives," Arch Toxicol (2016) 90:39-79.
Sun, Albert Y., et al., "Resveratrol as a Therapeutic Agent for Neurodegenerative Diseases," Mol. Neurobiol (2010) 41:375-383.
Rajput et al., "In situ nanostructured hydrogel of reservatrol for brain targeting: in vitro-in vivo characterization", Drug Delivery and Translational Research, May 21, 2018, pp. 1460-1470.
Huang, J.-H. et al. 2016 "Rifampicin-Induced Hepatic Lipid Accumulation: Association with Up-Regulation of Peroxisome Proliferator-Activated Receptor γ in Mouse Liver" PLoS ONE 11(11): e0165787.
Xu, Y. et al. 2016 "Effects of rifampicin on hepatotoxicity and genes related to bile acid metabolism in mice" Chinese Pharmacological Bulletin 12: 841-845.
Zhang, W. et al. 2016 "Rifampicin-induced injury in L02 cells is alleviated by 4-PBA via inhibition of the PERK-ATF4-CHOP pathway" Toxicology in Vitro 36 (2016) 186-196.
Zhang, T. et al. 2017 "Impairment of Mitochondrial Biogenesis and Dynamics Involved in Isoniazid-Induced Apoptosis of HepG2 Cells Was Alleviated by p38 MAPK Pathway" Front. Pharmacol. 8: 753.
Korean Office Action for App. No. 10-2021-7023135 dated May 15, 2025 in 6 pages.
Van Dam et al. "Symptomatic effect of donepezil, rivastigmine, galantamine and memantine on cognitive deficits in the APP23 model", Psychopharmacology (2005) 180: 177-190.
Gong et al. "Persistent improvement in synaptic and cognitive functions in an Alzheimer mouse model after rolipram treatment", The Journal of Clinical Investigation vol. 114 No. 11 (2004) 1624-1634.
Lebois et al. "Disease-Modifying Effects of M1 Muscarinic Acetylcholine Receptor Activation in an Alzheimer's Disease Mouse Model", ACS Chem Neurosci. (2017) 8(6):1177-1187.
Keskin et al. "BACE inhibition-dependent repair of Alzheimer's pathophysiology", PNAS (2017) vol. 114 No. 32: 8631-8636.
Kim et al. "EPPS rescues hippocampus-dependent cognitive deficits in APP/PS1 mice by disaggregation of amyloid-b oligomers and plaques", Nature Communications vol. 6, Article No. 8997 (2015).

* cited by examiner

Morris water maze (cognitive function test)

FIG. 12

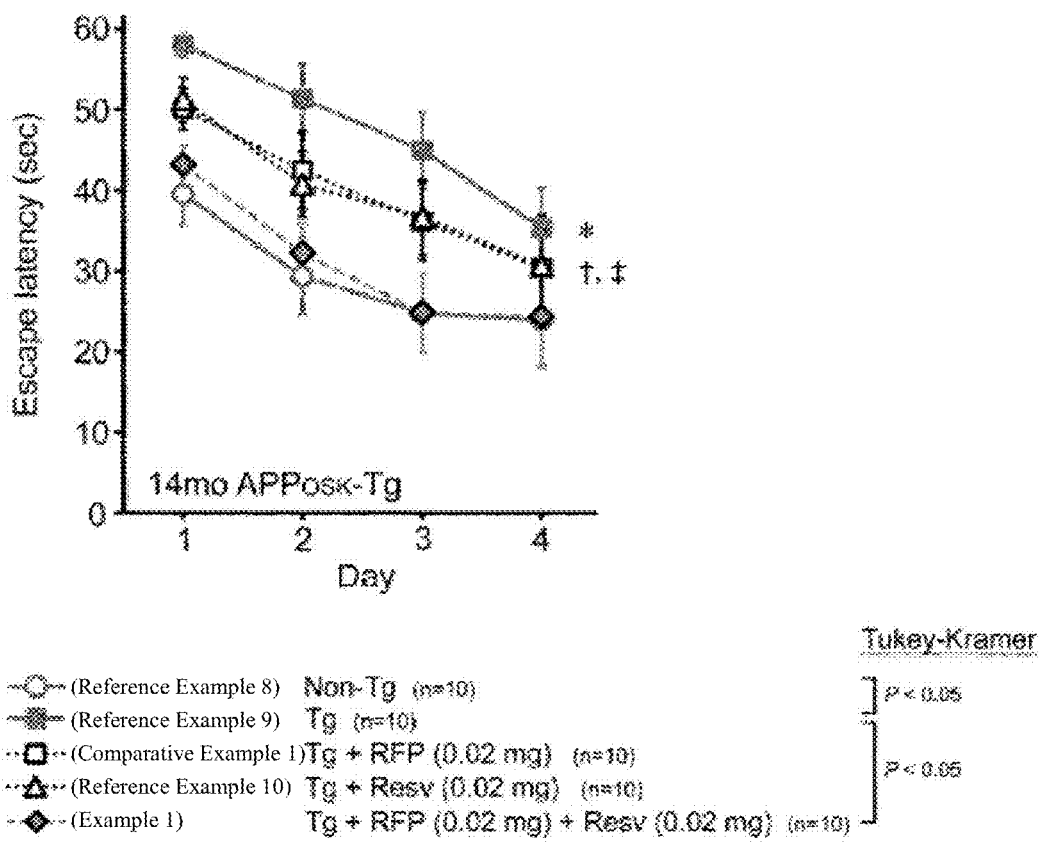

—◇— (Reference Example 8) Non-Tg (n=10)
—■— (Reference Example 9) Tg (n=10)
··□·· (Comparative Example 1) Tg + RFP (0.02 mg) (n=10)
··△·· (Reference Example 10) Tg + Resv (0.02 mg) (n=10)
—◆— (Example 1) Tg + RFP (0.02 mg) + Resv (0.02 mg) (n=10)

Tukey-Kramer $P < 0.05$
$P < 0.05$

Fisher's PLSD

\* Tg: $p = 0.0006$ vs nonTg (Reference Example 8)
   $= 0.0017$ vs Tg+RFP (0.02mg)+RSV (0.02mg) (Example 1)

† Tg+RFP (0.02mg) (Comparative Example 1): $p = 0.0428$ vs nonTg (Reference Example 8)

‡ Tg+Resv (0.02mg) (Reference Example 10) : $p = 0.0417$ vs nonTg (Reference Example 8)

−◯− (Reference Example 11) Non-Tg (n=10)
−■− (Reference Example 12) Tg (n=10)
−▲− (Example 2)  Tg + RFP (0.02 mg) + Resv (0.02 mg) (n=10)
−△− (Example 3)  Tg + RFP (0.01 mg) + Resv (0.01 mg) (n=9)

Fisher's PLSD
* Tg: $p < 0.0001$ vs non-Tg
† Tg+RFP (0.01mg) + Resv (0.01mg): $p = 0.0003$ vs Tg
                                    $< 0.0001$ vs non-Tg
‡ Tg+RFP (0.02mg) + Resv (0.02mg): $p < 0.0001$ vs Tg
                                    $= 0.0146$ vs non-Tg
                                    $= 0.0311$ vs Tg+RFP (0.01mg) + Resv (0.01mg)

Tukey-Kramer
* Tg: $p < 0.05$ vs non-Tg
† Tg+RFP (0.01mg) + Resv (0.01mg): $p < 0.05$ vs Tg
                                    $< 0.05$ vs non-Tg
‡ Tg+RFP (0.02mg) + Resv (0.02mg): $p < 0.05$ vs Tg

PROPHYLACTIC OR THERAPEUTIC DRUG FOR NEURODEGENERATIVE DISEASES

TECHNICAL FIELD

The present invention relates to a medicine which is useful for the prevention or treatment of a neurodegenerative disease and has reduced adverse side effects.

BACKGROUND ART

A neurodegenerative disease occurs in a central nerve system, and the pathological characteristics thereof include the loss of a specific nerve cell groups and the accumulation of a fibrous substance frequently occurring inside and outside a nerve cell.

Neurodegenerative diseases include: Alzheimer's disease (AD) in which amyloid-$\beta$(A$\beta$) is accumulated; tauopathy in which tau is accumulated; and synucleinopathy in which $\alpha$-synuclein is accumulated. Tauopathy includes frontotemporal lobar degeneration (FTLD) including Pick's disease, corticobasal degeneration (CBD) and progressive supranuclea palsy (PSP). AD may also be included in tauopathy, because A$\beta$ as well as tau are accumulated in AD. FTLD can also be referred to as "frontotemporal dementia (FTD)" when a clinical condition dementia is focused. Synucleinopathy includes dementia with Lewy bodies (DLB), Parkinson's disease (PD) and multiple system atrophy (MSA). Neurodegenerative disease has been considered to be developed by forming oligomers of the proteins in the brain to impart the function of nerve cells. Based on this consideration, as a therapeutic drug for a neurodegenerative disease, a drug has been developed which has properties such as an activity to inhibit the production of the proteins, an activity to inhibit the formation of an oligomer, and an activity to remove coagulated proteins from the brain.

For example, as for AD, an inhibitor of an enzyme involved in the production of A$\beta$ (e.g., $\beta$-secretase, $\gamma$-secretase), an A$\beta$ vaccine for removing A$\beta$ from the brain, an A$\beta$ antibody vaccine and the like have been developed and are subjected to clinical trial s. However, until now, most of these products are failed clinically for a reason that an unexpected adverse side effect occurs and a reason that a pharmacological effect cannot be achieved.

On the other hand, rifampicin, which is well-known as an antibiotic, has been used conventionally as an oral drug due to the antibacterial activity thereof. Rifampicin is also known to have free radical scavenging activities, wherein the involvement in the suppression of an A$\beta$ coagulation reaction has been reported as one of the activities (Non-Patent Document 1).

Resveratrol is a type of polyphenol contained in a fruit skin of grape, red wine, an astringent skin of peanuts and the like, and has been reported to have an anti-cancer effect, an anti-arteriosclerosis effect, an anti-obesity effect, an anti-diabetic effect, and anti-inflammation effect and the like (Non-Patent Document 2). In addition, it is also reported that resveratrol has an activity to reduce the oxidative stress of neuron-like cells. More specifically, it has been confirmed that resveratrol induces the phosphorylation of mitogen (division promoting factor)-activated protein (MAP) kinase in a differentiated or undifferentiated human neuroblast SH-SY5Y (Non-Patent Document 3). Meanwhile, an effect of resveratrol on Alzheimer's disease has also been expected. However, actually, it is reported that, when 119 patients having mild to moderate Alzheimer's disease were randomly divided into two groups and a 52-week test including the intake of 500 mg of resveratrol in one group and the intake of a placebo in other was carried out, in which such an administration schedule that the amount of resveratrol was increased by 500 mg every 13 weeks and was ultimately increased to 1000 mg twice per day was carried out, the effectiveness of the administration of resveratrol could not been confirmed in the resveratrol-administered group compared with the placebo-administered group (Non-Patent Document 4). Further meanwhile, as adverse side effects of resveratrol which occur when resveratrol is taken at a high dose or for a long period, vomiturition, diarrhea, body weight loss (Non-Patent Document 5), bellyache (Non-Patent Document 4), bladder injuries (Non-Patent Document 6), kidney injuries (Non-Patent Document 7) and the like have been reported.

PRIOR ART DOCUMENTS

Patent Documents

Non-Patent Document 1: Tomiyama, T. and six other persons, "Inhibition of amyloid beta protein aggregation and neurotoxicity by rifampicin. Its possible function as a hydroxyl radical scavenger.", J Biol Chem, 1996, Vol. 271, p. 6839-6844

Non-Patent Document 2: Yu W. et al., "Cellular and molecular effects of resveratrol in health and disease", J Cell Biochem, 2012, 113, p. 752-759

Non-Patent Document 3: Tredici G et al., "Resveratrol, map kinases and neuronal cells: might wine be a neuroprotectant?" Drug Exp Clin Res, 1999, 25, p. 99-103

Non-Patent Document 4: R. Scott Turner et al., "A randomized, double-blind, placebo-controlled trial of resveratrol for Alzheimer disease"2015, American Academy of Neurology, DOI: 10.1212/WNL.0000000000002035

Non-Patent Document 5: Brown V A. et al., "Repeat dose study of the cancer chemopreventive agent resveratrol in healthy volunteers: safety, pharmacokinetics, and effect on the insulin-like growth factor axis", Cancer Res, 2010, 70, p. 9003-9011

Non-Patent Document 6: Edwards J A et al., "Safety of resveratrol with examples for high purity, trans-resveratrol, resVida((R))", Ann N Y Acad Sci, 2011, 1215, p. 131-137

Non-Patent Document 7: Popat R et al., "A phase 2 study of SRT501 (resveratrol) with bortezomib for patients with relapsed and or refractory multiple myeloma", Br J Haematol, 2013, 160, p. 714-717

SUMMARY OF THE INVENTION

Problems to be Solved by the Invention

Besides the problem of adverse side effects, the cause of the failure of an A$\beta$-targeting drug (e.g., an A$\beta$ production enzyme inhibitor, an A$\beta$ vaccine, an A$\beta$ antibody) in clinical trial s for AD has been considered as the matter that the timing of administration is too late. That is, it is considered that it is meaningless unless the timing of the removal of A$\beta$ is before the onset of dementia at which nerve cells begin to die. Therefore, the role of an A$\beta$-targeting drug must be the prevention of dementia rather than the treatment of dementia. In a clinical trial for AD, there has been reported that a tau coagulation inhibitor, which is a tau-targeting drug that is first subjected to a clinical trial, does not show a cognitive function improving effect. This result is also considered to demonstrate that, even for a tau-targeting drug, the timing of administering the drug after the disease is developed is too late.

However, most of the therapeutic drugs now under development are not developed on the assumption that the therapeutic drugs are administered for prevention purposes, and have problems with respect to costs, adverse side effects, the methods of administration and the like. On the other hand, because the onset time of a neurodegenerative disease is generally unknown, when a drug is administered for preventing a neurodegenerative disease, a considerably long period should be assumed as the period of administration of a drug for the disease.

Meanwhile, the present inventors have found that rifampicin can inhibit the in vitro formation of oligomers of Aβ, tau and α-synuclein, and that rifampicin can inhibit the accumulation of oligomers of the proteins in the brain and can recover the cognitive function of the mouse when orally administered to an AD model mouse in which Aβ is accumulated and a FTD model mouse in which tau is accumulated. Therefore, the present inventors has been studied for the purpose of achieving the re-positioning of rifampicin as a prophylactic agent for a neurodegenerative disease by utilizing these properties of rifampicin.

As the result of the studies, however, the present inventors have faced the problem that adverse side effects of rifampicin, e.g., liver injuries and drug interaction, are serious problem for neurodegenerative disease subjects and, therefore, rifampicin itself makes the long-term intake as a prophylactic agent impossible. That is, it has been found that, in neurodegenerative disease subjects, the problem of adverse side effects of rifampicin is critical. In this regard, the term "drug interaction" refers to a phenomenon that rifampicin induces cytochrome P450 (CYP) and P-glycoprotein which are involved in drug metabolism in liver cells and, as a result, the effect of another drug that is taken simultaneously with rifampicin is weakened.

In these situations, the first object of the present invention is to provide a pharmaceutical formulation of rifampicin which can have reduced adverse side effects and can be administered for a long period.

As for resveratrol, when administered at the above-mentioned doses, no effect on Alzheimer's disease has been confirmed actually. When it is expected for resveratrol to exert the efficacy on Alzheimer's disease, it is considered to administer resveratrol at a higher dose for a longer period. However, there are concerns about the risk of adverse side effects, such as vomiturition, diarrhea, weight loss, bellyache, bladder injuries and kidney injuries, which have been reported when resveratrol is taken at a high dose and/or for a long period. Therefore, according to the facts that have been reported before now, it has been believed that the long-term administration or intake of resveratrol while securing an effective dose of resveratrol on a neurodegenerative disease such as Alzheimer's disease is impossible.

Therefore, the second object of the present invention is to provide a prophylactic or therapeutic drug for a neurodegenerative disease which can be administered for a long period and a brain function improving food which can be taken for a long period.

Means for Solving the Problem

The present inventors have found that, when rifampicin is combined with resveratrol, a remarkable adverse-side-effect-suppressing effect is shown and the long-term administration of resveratrol becomes possible. Furthermore, the present inventors have also found unexpectedly that resveratrol can reduce Aβ oligomers even at an extremely low dose, and have also found that cognitive function can be improved when resveratrol is administered or taken for a long term even at an extremely low dose. The present invention has been accomplished by further making studies on the basis of these findings.

That is, the present invention provides the following aspects of the invention.

1. A prophylactic or therapeutic drug for a neurodegenerative disease, comprising a combination of a rifampicin compound selected from the group consisting of rifampicin, a derivative of rifampicin and a salt of rifampicin or the derivative and a resveratrol compound selected from the group consisting of resveratrol and a derivative of resveratrol.
2. The prophylactic or therapeutic drug according to item 1, wherein the resveratrol compound is contained in an amount of 1/500 to 500 parts by weight relative to 1 part by weight of the rifampicin compound.
3. The prophylactic or therapeutic drug according to item 1 or 2, wherein a dose of the rifampicin compound is 3.75 mg/kg·day or less.
4. The prophylactic or therapeutic drug according to any one of items 1 to 3, wherein the dose of the rifampicin compound is 0.001 to 1.5 mg/kg·day.
5. The prophylactic or therapeutic drug according to any one of items 1 to 4, wherein a dose of the resveratrol compound is 3.75 mg/kg·day or less.
6. The prophylactic or therapeutic drug according to any one of items 1 to 5, wherein the dose of the resveratrol compound is 0.001 to 2.5 mg/kg·day.
7. The prophylactic or therapeutic drug according to any one of items 1 to 6, wherein the prophylactic or therapeutic drug is used for transnasal administration.
8. The prophylactic or therapeutic drug according to any one of items 1 to 7, wherein the prophylactic or therapeutic drug is used for prevention or treatment of dementia.
9. The prophylactic or therapeutic drug according to any one of items 1 to 8, wherein the prophylactic or therapeutic drug is a combination drug of the rifampicin compound with the resveratrol compound.
10. The prophylactic or therapeutic drug according to any one of items 1 to 8, wherein the prophylactic or therapeutic drug is a kit including a medicinal agent comprising the rifampicin compound and a medicinal agent comprising the resveratrol compound.
11. A prophylactic or therapeutic drug for a neurodegenerative disease for transnasal administration, comprising a resveratrol compound selected from the group consisting of resveratrol and a derivative of resveratrol, wherein a dose of the resveratrol compound is 0.28 mg/kg·day or less.
12. The prophylactic or therapeutic drug according to item 11, wherein the prophylactic or therapeutic drug is used for prevention or treatment of dementia.
13. The prophylactic or therapeutic drug according to item 11 or 12, wherein a period of administration is 1 month or longer.
14. A brain function improving food containing a resveratrol compound selected from the group consisting of resveratrol and a derivative of resveratrol, wherein an amount of intake of the resveratrol compound is 3.75 mg/kg·day or less.

15. A use of a rifampicin compound selected from the group consisting of rifampicin, a derivative of rifampicin and a salt of rifampicin or the derivative and a resveratrol compound selected from the group consisting of resveratrol and a derivative of resveratrol for the production of a medicine for preventing or treating a neurodegenerative disease.

16. A method for treating a neurodegenerative disease, comprising the step of administering an effective amount of a rifampicin compound selected from the group consisting of rifampicin, a derivative of rifampicin and a salt of rifampicin or the derivative and an effective amount of a resveratrol compound selected from the group consisting of resveratrol and a derivative of resveratrol to a neurodegenerative disease patient.

17. A method for preventing a neurodegenerative disease, comprising the step of administering an effective amount of a rifampicin compound selected from the group consisting of rifampicin, a derivative of rifampicin and a salt of rifampicin or the derivative and an effective amount of a resveratrol compound selected from the group consisting of resveratrol and a derivative of resveratrol to a non-progressor who has a high risk of developing a neurodegenerative disease.

18. A use of a resveratrol compound selected from the group consisting of resveratrol and a derivative of resveratrol for the production of a medicine for transnasal administration which is used for the prevention or treatment of a neurodegenerative disease and is administered at a dose of 0.28 mg/kg·day or less.

19. A method for treating a neurodegenerative disease, comprising the step of administering 0.28 mg/kg·day or less of a resveratrol compound selected from the group consisting of resveratrol and a derivative of resveratrol to a neurodegenerative disease patient transnasally.

20. The method according to item 19, wherein the period of administration is 1 month or longer.

21. A method for preventing a neurodegenerative disease, comprising the step of administering 0.28 mg/kg·day or less of a resveratrol compound selected from the group consisting of resveratrol and a derivative of resveratrol to a non-progressor having a high risk of developing a neurodegenerative disease transnasally.

22. The method according to item 21, wherein the period of administration is 1 month or longer.

23. A method for improving a brain function, comprising the step of allowing 3.75 mg/kg·day or less of a resveratrol compound selected from the group consisting of resveratrol and a derivative of resveratrol to be taken orally.

Advantages of the Invention

According to the prophylactic or therapeutic drug of the present invention, when rifampicin is formulated in the form of a combination preparation with resveratrol, the adverse side effects of rifampicin can be reduced and the long-term administration of rifampicin for a neurodegenerative disease becomes possible. Furthermore, according to the prophylactic or therapeutic drug of the present invention, because resveratrol can exert the efficacy on a neurodegenerative disease at an extremely low dose when formulated in single agent, long-term administration for a neurodegenerative disease becomes possible. Moreover, according to the food of the present invention, the long-term intake of the food for the purpose of the improvement of a brain function becomes possible because resveratrol is added to the food.

BRIEF DESCRIPTION OF THE DRAWINGS

FIG. 12 shows the results of the behavioral test carried out in Test Example 3, which demonstrate the effect of the administration of rifampicin (in combination with resveratrol) on the cognitive function in Alzheimer's disease model mice.

EMBODIMENTS OF THE INVENTION

Figure 1:
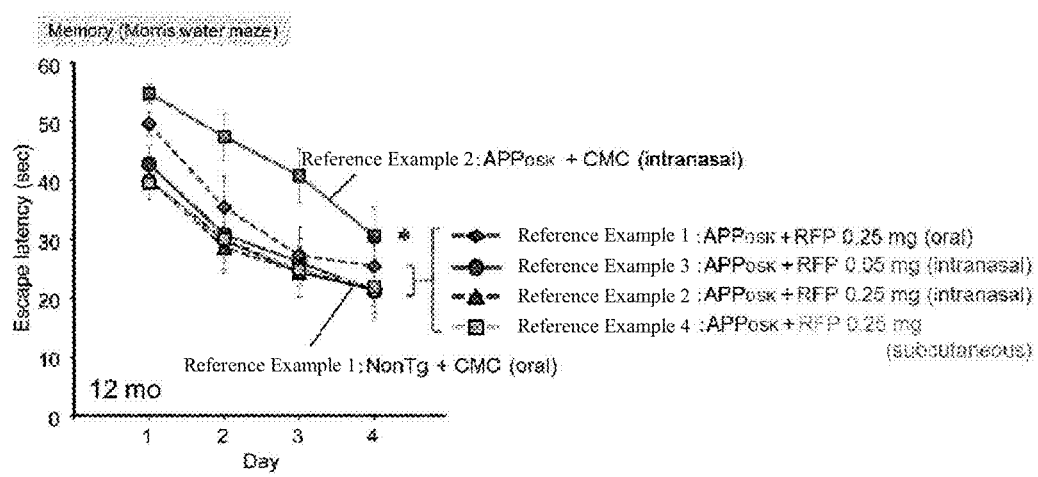
FIG. 1 shows the result of a behavioral test carried out in Test Example 1, which demonstrate the effect of the administration of rifampicin on cognitive function of mice.

[1. Prophylactic or Therapeutic Drug for Neurodegenerative Disease Containing Combination of Rifampicin Compound and Resveratrol Compound]

A first prophylactic or therapeutic drug of the present invention (also referred to as a "first medicine of the present invention", hereinafter) is characterized by containing a rifampicin compound selected from the group consisting of rifampicin, a derivative of rifampicin and a salt of rifampicin or the derivative and a resveratrol compound selected from the group consisting of resveratrol and a derivative of resveratrol and being capable of being used for the prevention or treatment of a neurodegenerative disease.

[Rifampicin Compound]

The first medicine of the present invention contains a rifampicin compound selected from the group consisting of rifampicin, a derivative of rifampicin and a salt of rifampicin or the derivative. Rifampicin is a known ingredient as an antibiotic.

In the first medicine of the present invention, the rifampicin compound acts as an active ingredient for removing an oligomer of a causative protein for a neurodegenerative disease. For example, the rifampicin compound has an effect to remove an oligomer of amyloid-β (Aβ) which is a causative protein for Alzheimer's disease (AD), an oligomer of tau which is a causative protein for tauopathy, and an oligomer of α-synuclein which is a causative protein for synucleinopathy. The rifampicin compound has a naphthohydroquinone or naphthoquinone structure, and this structure is believed to contribute to the activity of rifampicin as a free radical scavenger. In addition, rifampicin also has an excellent effect to suppress the aggregation/toxicity of a causative protein for a neurodegenerative disease. For example, it has been confirmed by the present inventors that rifampicin can completely suppress the toxicity of Aβ42 that has a higher aggregation ability and potent neurotoxicity. Rifampicin is a compound generally represented by formula (I).

[Chemical formula 1]

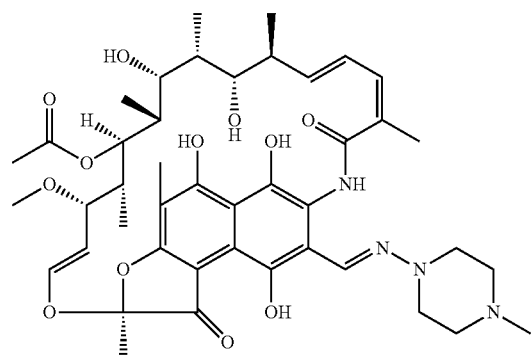

(1)

The derivative of rifampicin is not particularly limited, as long as the derivative has a naphthohydroquinone or naphthoquinone structure and is pharmaceutically acceptable. Examples of the derivative include 3-formyl-rifamycin SV, rifamycin S, rifamycin B, rifamycin SV and 25-desacetyl-rifampicin that is a main active metabolite. Among the rifampicin derivatives, derivatives each having no substituent at position-3 in a 1,4-dihydroxynaphthalene structure which is involved in antibiotic activities, such as Rifamycin SV, are preferred from the viewpoint of the inhibition of the induction of a resistant bacterium resulting from long-term administration. These rifampicin derivatives may be used singly, or two or more of them may be used in combination.

The salt of rifampicin is not particularly limited, as long as a salt of rifampicin or a rifampicin derivative can be formed and the salt is pharmaceutically acceptable. Examples of the salt include, but are not limited to: an alkali metal (e.g., potassium, sodium) salt, an alkaline earth metal (e.g., calcium, magnesium) salt, an ammonium salt, a pharmaceutically acceptable organic amine (e.g., tetramethylammonium, triethylamine, methylamine, dimethylamine, cyclopentylamine, benzylamine, phenethylamine, piperidine, monoethanolamine, diethanolamine, tris(hydroxymethyl)aminomethane, lysine, arginine, N-methyl-D-glucamine) salt, an inorganic acid salt (e.g., hydrochloride, hydrobromide, hydroiodide, sulfate, phosphate, nitrate), and an organic acid salt (e.g., acetate, lactate, tartrate, benzoate, citrate, methanesulfonate, ethanesulfonate, benzenesulphonate, toluenesulfonate, isethionate, glucuronate, gluconate). These salts may be used singly, or two or more of them may be used in combination.

As the rifampicin compound, any one compound selected from rifampicin, a salt of rifampicin, a derivative of rifampicin and a salt of a derivative of rifampicin may be used, or two or more compounds selected from the aforementioned compounds may be used in combination.

Among the above-mentioned rifampicin compounds, rifampicin and Rifamycin SV are preferred.

In the first medicine of the present invention, the content of the rifampicin compound is not particularly limited, and may be adjusted appropriately in such a manner that the rifampicin compound can be administered at the below-mentioned dose. For example, the content of the rifampicin compound in the first medicine of the present invention is 0.19 w/v % or more, preferably 0.4 w/v % or more, more preferably 0.5 w/v % or more. From the viewpoint that a specified dose can be administered in a fewer number of administrations efficiently, the content of the rifampicin compound in the first medicine of the present invention may be preferably 2 w/v % or more, 2.5 w/v % or more, 5 w/v % or more, or 30 w/v % or more. The content of the rifampicin compound in the first medicine of the present invention may be 95 w/v % or less, and is preferably 85 w/v % or less or 50 w/v % or less. When it is intended to prepare the first medicine of the present invention in a form suitable for transnasal administration, the content is preferably 85 w/v % or less or 50 w/v % or less, from the viewpoint of the achievement of satisfactory sprayability of the transnasal administration drug. Specifically, the range of the content of the rifampicin compound in the first medicine of the present invention is 0.19 to 95 w/v %, 0.19 to 85 w/v %, 0.19 to 50 w/v %, 0.4 to 95 w/v %, 0.4 to 85 w/v %, 0.4 to 50 w/v %, 0.5 to 95 w/v %, 0.5 to 85 w/v %, 0.5 to 50 w/v %, 2 to 95 w/v %, 2 to 85 w/v %, 2 to 50 w/v %, 2.5 to 95 w/v %, 2.5 to 85 w/v %, 2.5 to 50 w/v %, 5 to 95 w/v %, 5 to 85 w/v %, 5 to 50 w/v %, 30 to 95 w/v %, 30 to 85 w/v %, or 30 to 50 w/v %.

[Resveratrol Compound]

The first medicine of the present invention contains a resveratrol compound selected from the group consisting of resveratrol and a derivative thereof. Resveratrol is 3,5,4'-trihydroxystilbene. The resveratrol compound is an ingredient which has been reported to have a cancer prevention effect, a dementia prevention effect (an effect to suppress the formation of Aβ), an arteriosclerosis/heart disease prevention effect, an anti-metabolic effect, a life prolongation effect, and an ophthalmic disease prevention effect. In addition, the resveratrol compound also has an effect to protect the liver. On the other hand, resveratrol is not known to have an effect to remove an oligomer of a causative protein for a neurodegenerative disease which has been already produced. Furthermore, it has been confirmed by the present inventors that the effect to suppress the aggregation of a causative protein for a neurodegenerative disease by resveratrol is weak and the effect to suppress the toxicity of, for example, Aβ42 that has higher aggregation ability and stronger neurotoxicity is significantly weaker compared with rifampicin.

The first medicine of the present invention can exhibit a significant adverse-side-effect-suppressing effect, because rifampicin is combined with the resveratrol compound. When the resveratrol compound is combined with rifampicin, a remarkable adverse-side-effect-suppressing effect, i.e., an effective liver protection activity, can be exerted even if the resveratrol compound is contained at a dose at which the resveratrol compound cannot exert the effective liver protection activity singly.

In the first medicine of the present invention, the resveratrol compound is combined with rifampicin and, as a result, the effect to remove an oligomer of a causative protein for a neurodegenerative disease can be improved significantly. When resveratrol is combined with rifampicin, the effect of resveratrol to remove a causative protein for a neurodegenerative disease can be significantly improved even at a dose at which an insufficient Aβ production inhibition activity is shown when resveratrol alone is used.

Examples of resveratrol to be used in the present invention include a cis-isomer of resveratrol, a trans-isomer of resveratrol and a mixture thereof, preferably a trans-isomer of resveratrol. The trans-isomer of resveratrol is a compound represented by formula (II).

[Chemical formula 2]

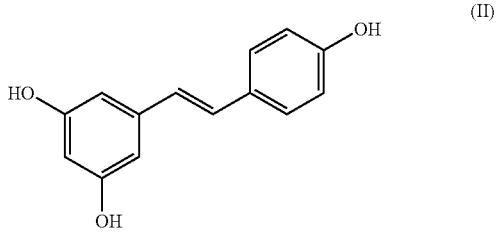

(II)

Resveratrol may be purified from a plant extract such as a lingonberry extract, a grape extract, a bilberry extract, a Japanese knotweed extract and a gnemon tree extract, or may be produced by a chemical synthesis method, a genetic engineering method or a microbiological method.

The derivative of resveratrol is not particularly limited, as long as the derivative is pharmaceutically acceptable. Examples of the derivative of resveratrol include: a protecting group such as an N-phenylacetyl group and a 4,4'-dimethoxytrityl (DMT) group; a biopolymer such as a protein, a peptide, a sugar, a lipid and a nucleic acid; a synthetic polymer such as polystyrene, polyethylene, polyvinyl and polyester; and a compound having a functional group, e.g., an ester group, as a derivative group. Examples of the ester group include: an aliphatic ester group such as a methyl ester group and an ethyl ester group; and an aromatic ester group.

As the resveratrol compound, a single compound may be selected from resveratrol and the resveratrol derivative, or two or more of them may be used in combination.

Among these resveratrol compounds, resveratrol is preferred, and a trans-isomer of resveratrol (e.g., 3,5,4'-trihydroxy-trans-stilben) is more preferred.

The content of the resveratrol compound in the first medicine of the present invention is not particularly limited, and can be adjusted appropriately in such a manner that the resveratrol compound can be administered at the below-mentioned dose. For example, in the first medicine of the present invention, the content of the resveratrol compound is 0.19 w/v % or more, preferably 0.4 w/v % or more, more preferably 0.5 w/v % or more. From the viewpoint that a specified dose can be administered in a fewer number of administrations efficiently, the content of the resveratrol compound in the first medicine of the present invention is preferably 2 w/v % or more, 2.5 w/v % or more, 5 w/v % or more, or 30 w/v % or more. The content of the resveratrol compound in the first medicine of the present invention is also 95 w/v % or less, preferably 85 w/v % or less or 50 w/v % or less. When it is intended to prepare the first medicine of the present invention in a form suitable for transnasal administration, the content is preferably 85 w/v % or less or 50 w/v % or less from the viewpoint that sprayability of the transnasal administration drug can be achieved satisfactorily. Specific examples of the range of content of the resveratrol compound the first medicine of the present invention include 0.19 to 95 w/v %, 0.19 to 85 w/v %, 0.19 to 50 w/v %, 0.4 to 95 w/v %, 0.4 to 85 w/v %, 0.4 to 50 w/v %, 0.5 to 95 w/v %, 0.5 to 85 w/v %, 0.5 to 50 w/v %, 2 to 95 w/v %, 2 to 85 w/v %, 2 to 50 w/v %, 2.5 to 95 w/v %, 2.5 to 85 w/v %, 2.5 to 50 w/v %, 5 to 95 w/v %, 5 to 85 w/v %, 5 to 50 w/v %, 30 to 95 w/v %, 30 to 85 w/v %, and 30 to 50 w/v %.

In the first medicine of the present invention, the content ratio between the rifampicin compound and the resveratrol compound is not particularly limited, and may be determined depending on the content of each of the above-mentioned components. When it is intended to prepare the first medicine of the present invention in a form suitable for transnasal administration, it is possible to prepare in such a manner that the content of the resveratrol compound is larger than a predetermined effective amount, with taking the difference between the solubility of the rifampicin compound in water (for example, as for rifampicin, 2.5 mg/mL at 25° C.) and the solubility of the resveratrol compound in water (for example, as for resveratrol, 0.03 mg/mL at 25° C.) and the fact that a component having smaller solubility in water is more likely to be affected by the migration of a mucus layer by ciliated cells in the nasal cavity and therefore is more likely to flow into the digestive tract into consideration. For example, when it is intended to prepare the first medicine of the present invention for the purpose of allowing the rifampicin compound and the resveratrol compound to be absorbed at a ratio of about 1:1 through the paranasal cavity, it is possible to adjust the content of the resveratrol compound per 1 part by weight of the rifampicin compound to an amount more than 1 part by weight. Examples of the case where the difference in solubility in water between the rifampicin compound and the resveratrol compound is taken into consideration include: a case where the first medicine of the present invention is prepared in the form of a combination drug of the rifampicin compound and the resveratrol compound; and a case where the first medicine of the present invention is prepared in the form of a kit including a medicinal agent including the rifampicin compound and a medicinal agent including the resveratrol compound, in which both of the medicinal agents are prepared using the same base material composed of at least water.

From these viewpoints, the lower limit of the content of the resveratrol compound per 1 part by weight of the rifampicin compound is, for example, 1/500 part by weight or more, preferably 1/300 part by weight or more, more preferably 1/200 part by weight or more, still more preferably 1/100 part by weight or more, further preferably 0.05 part by weight or more, still further preferably 0.1 part by weight or more, especially preferably 0.2 part by weight or more. From the viewpoint that a still more preferred adverse-side-effect-suppressing effect can be achieved and/or the viewpoint that a still more preferred effect to remove an oligomer of a neurodegenerative disease causative protein, the content of the resveratrol compound per 1 part by weight of rifampicin is preferably 0.5 part by weight or more, more preferably 0.8 part by weight or more, still more preferably 1 part by weight or more. The content of the resveratrol compound per 1 part by weight of rifampicin may be more than 1 part by weight, such as 1.2 parts by weight or more, 1.5 parts by weight or more, 2 parts by weight or more or 3 parts by weight or more.

The upper limit of the content of the resveratrol compound per 1 part by weight of the rifampicin compound is, for example, 500 parts by weight or less, preferably 300 parts by weight or less, more preferably 200 parts by weight or less, still more preferably 100 parts by weight or less, 75 parts by weight or less, 50 parts by weight or less, 30 parts by weight or less or 20 parts by weight or less, further preferably 10 parts by weight or less, still further preferably 5 parts by weight or less, especially preferably 3 parts by weight or less, 2 parts by weight or less, 1.5 parts by weight or less or 1.2 parts by weight or less.

More specifically, the range of the content of the resveratrol compound per 1 part by weight of the rifampicin compound is 1/500 to 500 parts by weight, 1/500 to 300 parts by weight, 1/500 to 200 parts by weight, 1/500 to 100 parts by weight, 1/500 to 75 parts by weight, 1/500 to 50 parts by weight, 1/500 to 30 parts by weight, 1/500 to 20 parts by weight, 1/500 to 10 parts by weight, 1/500 to 5 parts by weight, 1/500 to 3 parts by weight, 1/500 to 2 parts by weight, 1/500 to 1.5 parts by weight, 1/500 to 1.2 parts by weight, 1/300 to 500 parts by weight, 1/300 to 300 parts by weight, 1/300 to 20 parts by weight, 1/300 to 100 parts by weight, 1/300 to 75 parts by weight, 1/300 to 50 parts by weight, 1/300 to 30 parts by weight, 1/300 to 20 parts by weight, 1/300 to 10 parts by weight, 1/300 to 5 parts by weight, 1/300 to 3 parts by weight, 1/300 to 2 parts by weight, 1/300 to 1.5 parts by weight, 1/300 to 1.2 parts by weight, 1/200 to 500 parts by weight, 1/200 to 300 parts by weight, 1/200 to 200 parts by weight, 1/200 to 100 parts by weight, 1/200 to 75 parts by weight, 1/200 to 50 parts by weight, 1/200 to 30 parts by weight, 1/200 to 20 parts by weight, 1/200 to 10 parts by weight, 1/200 to 5 parts by weight, 1/200 to 3 parts by weight, 1/200 to 2 parts by weight, 1/200 to 1.5 parts by weight, 1/200 to 1.2 parts by weight, 1/100 to 500 parts by weight, 1/100 to 300 parts by weight, 1/100 to 200 parts by weight, 1/100 to 100 parts by weight, 1/100 to 75 parts by weight, 1/100 to 50 parts by weight, 1/100 to 30 parts by weight, 1/100 to 20 parts by weight, 1/100 to 10 parts by weight, 1/100 to 5 parts by weight, 1/100 to 3 parts by weight, 1/100 to 2 parts by weight, 1/100 to 1.5 parts by weight, 1/100 to 1.2 parts by weight, 0.05 to 500 parts by weight, 0.05 to 300 parts by weight, 0.05 to 200 parts by weight, 0.05 to 100 parts by weight, 0.05 to 75 parts by weight, 0.05 to 50 parts by weight, 0.05 to 30 parts by weight, 0.05 to 20 parts by weight, 0.05 to 10 parts by weight, 0.05 to 5 parts by weight, 0.05 to 3 parts by weight, 0.05 to 2 parts by weight, 0.05 to 1.5 parts by weight, 0.05 to 1.2 parts by weight, 0.1 to 500 parts by weight, 0.1 to 300 parts by weight, 0.1 to 200 parts by weight, 0.1 to 100 parts by weight, 0.1 to 75 parts by weight, 0.1 to 50 parts by weight, 0.1 to 30 parts by weight, 0.1 to 20 parts by weight, 0.1 to 10 parts by weight, 0.1 to 5 parts by weight, 0.1 to 3 parts by weight, 0.1 to 2 parts by weight, 0.1 to 1.5 parts by weight, 0.1 to 1.2 parts by weight, 0.2 to 500 parts by weight, 0.2 to 300 parts by weight, 0.2 to 200 parts by weight, 0.2 to 100 parts by weight, 0.2 to 75 parts by weight, 0.2 to 50 parts by weight, 0.2 to 30 parts by weight, 0.2 to 20 parts by weight, 0.2 to 10 parts by weight, 0.2 to 5 parts by weight, 0.2 to 3 parts by weight, 0.2 to 2 parts by weight, 0.2 to 1.5 parts by weight, 0.2 to 1.2 parts by weight, 0.5 to 500 parts by weight, 0.5 to 300 parts by weight, 0.5 to 200 parts by weight, 0.5 to 100 parts by weight, 0.5 to 75 parts by weight, 0.5 to 50 parts by weight, 0.5 to 30 parts by weight, 0.5 to 20 parts by weight, 0.5 to 10 parts by weight, 0.5 to 5 parts by weight, 0.5 to 3 parts by weight, 0.5 to 2 parts by weight, 0.5 to 1.5 parts by weight, 0.5 to 1.2 parts by weight, 0.8 to 500 parts by weight, 0.8 to 300 parts by weight, 0.8 to 200 parts by weight, 0.8 to 100 parts by weight, 0.8 to 75 parts by weight, 0.8 to 50 parts by weight, 0.8 to 30 parts by weight, 0.8 to 20 parts by weight, 0.8 to 10 parts by weight, 0.8 to 5 parts by weight, 0.8 to 3 parts by weight, 0.8 to 2 parts by weight, 0.8 to 1.5 parts by weight, 0.8 to 1.2 parts by weight, 1 to 500 parts by weight, 1 to 300 parts by weight, 1 to 200 parts by weight, 1 to 100 parts by weight, 1 to 75 parts by weight, 1 to 50 parts by weight, 1 to 30 parts by weight, 1 to 20 parts by weight, 1 to 10 parts by weight, 1 to 5 parts by weight, 1 to 3 parts by weight, 1 to 2 parts by weight, 1 to 1.5 parts by weight, or 1 to 1.2 parts by weight.

More specifically, the range of the content of the resveratrol compound per 1 part by weight of the rifampicin compound may be 1.2 to 500 parts by weight, 1.2 to 300 parts by weight, 1.2 to 200 parts by weight, 1.2 to 100 parts by weight, 1.2 to 75 parts by weight, 1.2 to 50 parts by weight, 1.2 to 30 parts by weight, 1.2 to 20 parts by weight, 1.2 to 10 parts by weight, 1.2 to 5 parts by weight, 1.5 to 500 parts by weight, 1.5 to 300 parts by weight, 1.5 to 200 parts by weight, 1.5 to 100 parts by weight, 1.5 to 75 parts by weight, 1.5 to 50 parts by weight, 1.5 to 30 parts by weight, 1.5 to 20 parts by weight, 1.5 to 10 parts by weight, 1.5 to 5 parts by weight, 2 to 500 parts by weight, 2 to 300 parts by weight, 2 to 200 parts by weight, 2 to 100 parts by weight, 2 to 75 parts by weight, 2 to 50 parts by weight, 2 to 30 parts by weight, 2 to 20 parts by weight, 2 to 10 parts by weight, 2 to 5 parts by weight, 3 to 500 parts by weight, 3 to 300 parts by weight, 3 to 200 parts by weight, 3 to 100 parts by weight, 3 to 75 parts by weight, 3 to 50 parts by weight, 3 to 30 parts by weight, 3 to 20 parts by weight, 3 to 10 parts by weight or 3 to 5 parts by weight.

[Dosage Form]

The first medicine of the present invention is prepared by blending the rifampicin compound with the resveratrol compound and then preparing the resultant mixture into a pharmaceutical preparation by a known technique, in which a pharmacologically acceptable base material and/or additive may be mixed appropriately depending on the type of the method for administration of the first medicine.

Examples of the pharmacologically acceptable base material and/or the additive include an excipient, a thickening agent, a lubricating agent, a binder, a disintegrating agent, a solvent, a solubilizing agent, a suspending agent, an emulsifying agent, a tonicity-adjusting agent, a buffering agent, a soothing agent and a stabilizing agent. If necessary, an additive such as a preservative agent (an antiseptic agent), a pH adjusting agent, a refrigerant agent, an antioxidant agent, a moistening agent, an adhesive agent and an odor-improving agent may also be contained.

Examples of the excipient include lactose, white sugar, D-mannitol, starch, cornstarch, crystalline cellulose, and light anhydrous silicic acid. Examples of the thickening agent include: a polyhydric alcohol such as glycerin and macrogol; a cellulose such as methyl cellulose, carboxymethyl cellulose and hydroxypropylmethyl cellulose; a hydrophilic polymer such as polyvinyl alcohol, polyvinylpyrrolidone, carboxyvinyl polymer, sodium carboxymethylcellulose, methyl cellulose, hydroxymethyl cellulose, hydroxyethyl cellulose and hydroxypropyl cellulose (preferably sodium carboxymethylcellulose); sodium alginate; chondroitin sulfate; cyclodextrin; d-α-tocopherol polyethylene glycol 1000 succinate and polyethylene glycol. Examples of the lubricating agent include magnesium stearate, calcium stearate, talc, and colloidal silica. Examples of the binder include crystalline cellulose, white sugar, D-mannitol, dextrin, hydroxypropyl cellulose, hydroxypropylmethyl cellulose, polyvinylpyrrolidone, starch, sucrose, gelatin, methyl cellulose, and sodium carboxymethylcellulose. Examples of the disintegrating agent include starch, carboxymethyl cellulose, calcium carboxymethylcellulose, croscarmellose sodium, sodium carboxymethyl starch, and L-hydroxypropyl cellulose. Examples of the solvent include water, ethanol, isopropyl alcohol, acetone, propylene glycol, macrogol, sesame oil, and corn oil, in which it is preferred for the solvent to contain at least water. Examples of the solubilizing agent include: a cellulose such as methyl cellulose, carboxymethyl cellulose, hydroxypropylmethyl cellulose; and polyethylene glycol, propylene glycol, D-mannitol, benzyl benzoate, ethanol, tris-aminomethane, cholesterol, triethanolamine, sodium carbonate, sodium citrate, polyvinylpyrrolidone, and macrogol. Examples of the suspending agent include: a surfactant such as stearyl triethanolamine, sodium lauryl sulfate, sodium laurylaminopropioate, lecithin, benzalkonium chloride, benzethonium chloride, glyceryl monostearate, polyoxyethylene hydrogenated castor oil, polysorbate; a polyhydric alcohol such as glycerin, macrogol; a sugar such as sorbitol, mannitol, sucrose; a cellulose such as methyl cellulose, carboxymethyl cellulose, hydroxypropylmethyl cellulose; a hydrophilic polymer such as polyvinyl alcohol, polyvinylpyrrolidone, carboxyvinyl polymer, sodium carboxymethylcellulose, methyl cellulose, hydroxymethyl cellulose, hydroxyethyl cellulose, hydroxypropyl cellulose; and chondroitin sulfate. Examples of the tonicity-adjusting agent include glucose, D-sorbitol, sodium chloride, glycerin, D-mannitol, potassium chloride, concentrated glycerin, propylene glycol, and sucrose. Examples of the buffering agent include a phosphate salt (e.g., sodium hydrogenphosphate, sodium dihydrogenphosphate), boric acid, borax, an acetate salt (e.g., sodium acetate), a carbonate salt (e.g., sodium carbonate, calcium carbonate, potassium carbonate), citric acid, and sodium L-glutamate. Examples of the soothing agent include benzyl alcohol, chlorobutanol, propylene glycol, ethyl aminobenzoate, and lidocaine. Examples of the stabilizing agent include: a sulfur compound such as sodium sulfite, sodium hydrogensulfite, sodium metabisulfite, sodium thiosulfate, rongalite, thioglycerol, thioglycolic acid, thiolactic acid, cysteine, glutathione, thioacetic acid, methionine, thiosorbitol, thioglucose, and thiourea; an inorganic acid and a salt thereof, such as boric acid, borax, phosphoric acid, metaphosphoric acid, sodium carbonate, and sodium bicarbonate; an organic acid, such as formic acid, oxalic acid, tartaric acid, citric acid, and edetic acid, and a salt thereof (e.g., sodium edetate); an acid amide such as acetamide, diethylacetamide, nicotinamide, urea and barbital; a urea derivative; a polyhydric alcohol such as glycol, propylene glycol, glycerin, polyethylene glycol, glucose and ascorbic acid; a sugar; a phenol compound such as phenol, thymol, quinone, coumarone and isocoumarone; dibutylhydroxytoluene; an amino acid such as glycine, glutamic acid, lysine, phenylalanine, casein and edestin; and a protein. Examples of the emulsifying agent include a glycerin ester (e.g., glyceryl monooleate), saponin (e.g., sophora saponin, quillaia extract, soybean saponin), a sucrose fatty acid ester, lecithin (e.g., vegetable lecithin, egg yolk lecithin, soybean lecithin), a polyhydric alcohol (e.g., oleyl alcohol, stearyl alcohol, cetyl alcohol), a fatty acid ester (e.g., octyldodecyl myristate), a middle-chain fatty acid triglyceride (MCT), various surfactants (e.g., an alkylbenzene sulfonate-type emulsifying agent, benzalkonium chloride, sorbitan sesquioleate, dodecylbenzenesulfonic acid), and triethanolamine. Examples of the preservative agent (antiseptic agent) include: a paraoxybenzoic acid ester such as propyl paraoxybenzoate and butyl para-oxybenzoate; a paraben such as methylparaben, ethylparaben, propylparaben and butylparaben; an invert soap such as benzalkonium chloride, benzethonium chloride, chlorhexidine gluconate and cetylpyridinium chloride; an alcohol derivative such as chlorobutanol, benzyl alcohol and phenethyl alcohol; an organic acid and salt thereof, such as sodium dehydroacetate, sorbic acid and sodium sorbate; and a phenol such as para-chloromethoxyphenol and para-chlorometacresol. Examples of the pH adjusting agent include sodium hydroxide, potassium hydroxide, trisodium phosphate, disodium hydrogenphosphate, hydrochloric acid, nitric acid, citric acid, boric acid and acetic acid. Examples of the refrigerant agent include 1-menthol, camphor, and peppermint water. Examples of the antioxidant agent include a sulfite, ascorbic acid, citric acid and sodium edetate. Examples of the moistening agent include propylene glycol, polysorbate, macrogol, and glycerin. Examples of the adhesive agent include hydroxypropyl cellulose, hydroxypropylmethyl cellulose 2208, carboxyvinyl polymer, propylene glycol, and polysorbate 80. Examples of the odor-improving agent include trehalose, malic acid, maltose, potassium gluconate, anise essential oil, vanilla essential oil, cardamom essential oil, and a crude drug ingredient.

The first medicine of the present invention may be in the form of a liquid preparation or a solid preparation, and is preferably in the form of a liquid preparation. When it is intended to prepare a liquid preparation, the liquid preparation can be produced by mixing the rifampicin compound and the resveratrol compound and optionally a solvent, a solubilizing agent, a suspending agent, a tonicity-adjusting agent, a buffering agent, a soothing agent and the like together to dissolve, suspend or emulsify these components. When the first medicine of the present invention is intended to be prepared as a transnasal administration drug, it is also preferred to further add a thickening agent to increase the viscosity of the solution, thereby imparting retentivity. When the first medicine of the present invention is intended to be prepared as a solid preparation, the solid prepared can be prepared by mixing the rifampicin compound and the resveratrol compound and optionally an excipient, a binder, a disintegrating agent or a proper other additive together homogeneously, then granulating the resultant mixture by a proper granulation method to produce granules, and then making the granules into a power or fine granules by a proper drying method.

When the first medicine of the present invention is prepared as a transnasal administration drug, the first medicine may be packed in a container for transnasal administration upon use. As the container for transnasal administration, a proper commercially available container may be used.

A more specific example of the form of the first medicine of the present invention is a combination drug of the rifampicin compound and the resveratrol compound. The combination drug is a pharmaceutical composition in which the rifampicin compound and the resveratrol compound are contained in a mixed state. According to this combination drug, the rifampicin compound and the resveratrol compound can be administered simultaneously in any dosage form.

Another specific example of the form of the first medicine of the present invention is a kit including a medicinal agent containing the rifampicin compound and a medicinal agent containing the resveratrol compound. These medicinal agents may be prepared using the same base material and/or the same additive, or may be prepared using base materials and/or additives which are respectively selected for the rifampicin compound and the resveratrol compound. According to the kit, the rifampicin compound and the resveratrol compound can be administered separately in any dosage forms. When the kit is applied to a transnasal administration device equipped with a single cartridge packed with the medicinal agent containing the rifampicin compound and another single cartridge packed with the medicinal agent containing the resveratrol compound per transnasal administration device, the kit enables the simultaneous administration of both of the components.

[Dose and Usage]

The first medicine of the present invention contains resveratrol in combination with rifampicin and, as a result, can be reduced in adverse side effects significantly and can be administered for a long period. In addition, the first medicine of the present invention contains resveratrol in combination with rifampicin and, as a result, can be significantly improved in the effect to remove an oligomer of a causative protein for a neurodegenerative disease. Therefore, the first medicine can be administered at a smaller dose than the effective amount when used as an antibiotic. Therefore, the first medicine of the present invention can be administered at a smaller dose for a longer period compared with the case where rifampicin is administered as an antibiotic. The pharmaceutical composition of the present invention may be prepared in a form suitable for any one of oral administration, subcutaneous administration and transnasal administration. Among these administration routes, the first medicine of the present invention is more preferably prepared in a form suitable for transnasal administration, from the viewpoint that the administration route is non-invasive and a still more desirable adverse-side-effect-suppressing effect can be achieved and from the viewpoint that the administration is performed at a smaller dose and/or for a longer period.

Because the first medicine of the present invention can have significantly reduced adverse side effects, the dose of the first medicine of the present invention for a human body may be such that the dose of the rifampicin compound can become smaller than the dose employed when the rifampicin compound is administered as an antibiotic (for example 7.5 to 10 mg/kg·day). For example, the dose of the rifampicin compound is ½ or less, preferably ⅓ or less, more preferably 1/3.75 or less, of the dose employed when the rifampicin compound is administered as an antibiotic (for example 7.5 to 10 mg/kg·day). When the first medicine of the present invention is intended to be prepared for transnasal administration use, the dose of the rifampicin compound is, for example, ⅕ or less of the dose employed when the rifampicin compound is administered orally as an antibiotic (for example, 7.5 to 10 mg/kg·day).

A more specific example of the dose of the first medicine of the present invention for a human body is such that the lower limit of the dose of the rifampicin compound is, for example, 0.15 mg/kg·day or more, preferably 0.3 mg/kg·day or more, more preferably 0.75 mg/kg·day or more, still more preferably 1 mg/kg·day or more, from the viewpoint that the pharmacological effect can be exerted. The upper limit of the dose of the rifampicin compound for a human body is, for example, 3.75 mg/kg·day or less, preferably 2.5 mg/kg·day or less, more preferably 2 mg/kg·day or less, from the viewpoint that the adverse side effects can be reduced.

When the first medicine of the present invention is prepared for transnasal administration, the dose of the rifampicin compound may be further reduced. The first medicine of the present invention contains the resveratrol compound in combination with the rifampicin compound and, as a result, can significantly improve the effect to remove an oligomer of a causative protein for a neurodegenerative disease. Therefore, when combined with the rifampicin compound, the effect to remove a causative protein for a neurodegenerative disease can be exerted effectively even at a dose at which an effective effect to remove a causative protein for a neurodegenerative disease cannot be achieved by the rifampicin compound alone. With respect to the effect of the rifampicin compound combined with resveratrol compound, the lower limit of the dose of the rifampicin compound for a human body is, for example, 0.001 mg/kg·day or more, preferably 0.002 mg/kg·day or more, more preferably 0.003 mg/kg·day or more, still more preferably, 0.005 mg/kg·day or more, further preferably 0.01 mg/kg·day or more, from the viewpoint that the pharmacological effect can be exerted. From the viewpoint that the preferred pharmacological effect can be exerted more effectively, the lower limit of the dose of the rifampicin compound for a human body may be, for example, 0.025 mg/kg·day or more, preferably 0.05 mg/kg·day or more, more preferably 0.1 mg/kg·day or more. From the viewpoint that the reduction in adverse side effects can be achieved still more effectively, the upper limit of the dose of the rifampicin compound for a human body may be 1.5 mg/kg·day or less, preferably 1 mg/kg·day or less, more preferably 0.5 mg/kg·day or less, still more preferably 0.1 mg/kg·day or less, further preferably 0.07 mg/kg·day or less.

More specifically, the range of the dose of the rifampicin compound in the first medicine of the present invention is 0.001 to 3.75 mg/kg·day, 0.001 to 2.5 mg/kg·day, 0.001 to 2 mg/kg·day, 0.001 to 1.5 mg/kg·day, 0.001 to 1 mg/kg·day, 0.001 to 0.5 mg/kg·day, 0.001 to 0.1 mg/kg·day, 0.001 to 0.07 mg/kg·day, 0.002 to 3.75 mg/kg·day, 0.002 to 2.5 mg/kg·day, 0.002 to 2 mg/kg·day, 0.002 to 1.5 mg/kg·day, 0.002 to 1 mg/kg·day, 0.002 to 0.5 mg/kg·day, 0.002 to 0.1 mg/kg·day, 0.002 to 0.07 mg/kg·day, 0.003 to 3.75 mg/kg·day, 0.003 to 2.5 mg/kg·day, 0.003 to 2 mg/kg·day, 0.003 to 1.5 mg/kg·day, 0.003 to 1 mg/kg·day, 0.003 to 0.5 mg/kg·day, 0.003 to 0.1 mg/kg·day, 0.003 to 0.07 mg/kg·day, 0.005 to 3.75 mg/kg·day, 0.005 to 2.5 mg/kg·day, 0.005 to 2 mg/kg·day, 0.005 to 1.5 mg/kg·day, 0.005 to 1 mg/kg·day, 0.005 to 0.5 mg/kg·day, 0.005 to 0.1 mg/kg·day, 0.005 to 0.07 mg/kg·day, 0.01 to 3.75 mg/kg·day, 0.01 to 2.5 mg/kg·day, 0.01 to 2 mg/kg·day, 0.01 to 1.5 mg/kg·day, 0.01 to 1 mg/kg·day, 0.01 to 0.5 mg/kg·day, 0.01 to 0.1 mg/kg·day, 0.01 to 0.07 mg/kg·day, 0.025 to 3.75 mg/kg·day, 0.025 to 2.5 mg/kg·day, 0.025 to 2 mg/kg·day, 0.025 to 1.5 mg/kg·day, 0.025 to 1 mg/kg·day, 0.025 to 0.5 mg/kg·day, 0.025 to 0.1 mg/kg·day, 0.025 to 0.07 mg/kg·day, 0.05 to 3.75 mg/kg·day, 0.05 to 2.5 mg/kg·day, 0.05 to 2 mg/kg·day, 0.05 to 1.5 mg/kg·day, 0.05 to 1 mg/kg·day, 0.05 to 0.5 mg/kg·day, 0.05 to 0.1 mg/kg·day, 0.05 to 0.07 mg/kg·day, 0.1 to 3.75 mg/kg·day, 0.1 to 2.5 mg/kg·day, 0.1 to 2 mg/kg·day, 0.1 to 1.5 mg/kg·day, 0.1 to 1 mg/kg·day, 0.1 to 0.5 mg/kg·day, 0.15 to 3.75 mg/kg·day, 0.15 to 2.5 mg/kg·day, 0.15 to 2 mg/kg·day, 0.15 to 1.5 mg/kg·day, 0.15 to 1 mg/kg·day, 0.15 to 0.5 mg/kg·day, 0.3 to 3.75 mg/kg·day, 0.3 to 2.5 mg/kg·day, 0.3 to 2 mg/kg·day, 0.3 to 1.5 mg/kg·day, 0.75 to 3.75 mg/kg·day, 0.75 to 2.5 mg/kg·day, 0.75 to 2 mg/kg·day, 0.75 to 1.5 mg/kg·day, 1 to 3.75 mg/kg·day, 1 to 2.5 mg/kg·day, 1 to 2 mg/kg·day, or 1 to 1.5 mg/kg·day.

More specifically, the dose of the first medicine of the present invention for a human body is such that the dose of the resveratrol compound is, for example, 0.025 mg/kg·day or more, preferably 0.05 mg/kg·day or more, more preferably 0.1 mg/kg·day or more, and is also preferably 0.15 mg/kg·day or more, further preferably 0.3 mg/kg·day or more, still further preferably 0.75 mg/kg·day or more, especially preferably 1 mg/kg·day or more, from the viewpoint of the reduction in adverse side effects and from the viewpoint of the improvement in the effect to remove an oligomer of a causative protein for a neurodegenerative disease. The upper limit of the dose of the resveratrol compound for a human body is not particularly limited, and is, for example, 3.75 mg/kg·day or less.

With respect to the resveratrol compound to be combined with rifampicin, when the resveratrol compound is combined with rifampicin, the resveratrol compound can exhibit an effective liver protection activity even at a dose at which an effective protection activity cannot be exerted by the resveratrol compound alone. Furthermore, an activity to remove an oligomer of a causative protein for a progressed neurodegenerative disease is not known in the resveratrol compound to be combined with rifampicin, and the activity to remove an oligomer of a causative protein for a neurodegenerative disease in the resveratrol compound has been found by the present inventors. In the present invention, when the resveratrol compound is combined with rifampicin, the resveratrol compound can be significantly improved the effect to remove a causative protein for a progressed neurodegenerative disease even at a dose at which just a slow Aβ production inhibition activity can be exerted by the resveratrol compound alone. In view of these effects by resveratrol, the lower limit of the dose of the resveratrol compound for a human body may be, for example, 0.001 mg/kg·day or more, preferably 0.002 mg/kg·day or more, more preferably 0.003 mg/kg·day or more, still more preferably, 0.005 mg/kg·day or more, most preferably 0.01 mg/kg·day or more, from the viewpoint of the development of a pharmacological activity. The upper limit of the dose of the resveratrol compound for a human body is preferably 2.5 mg/kg·day or less, more preferably 2 mg/kg·day or less, still more preferably 1.5 mg/kg·day or less. Furthermore, the upper limit of the dose of the resveratrol compound for a human body is also preferably 1 mg/kg·day or less, more preferably 0.5 mg/kg·day or less, still more preferably 0.1 mg/kg·day or less, further preferably 0.07 mg/kg·day or less.

More specifically, the range of the dose of the resveratrol compound in the first medicine of the present invention is 0.001 to 3.75 mg/kg·day, 0.001 to 2.5 mg/kg·day, 0.001 to 2 mg/kg·day, 0.001 to 1.5 mg/kg·day, 0.001 to 1 mg/kg·day, 0.001 to 0.5 mg/kg·day, 0.001 to 0.1 mg/kg·day, 0.001 to 0.07 mg/kg·day, 0.002 to 3.75 mg/kg·day, 0.002 to 2.5 mg/kg·day, 0.002 to 2 mg/kg·day, 0.002 to 1.5 mg/kg·day, 0.002 to 1 mg/kg·day, 0.002 to 0.5 mg/kg·day, 0.002 to 0.1 mg/kg·day, 0.002 to 0.07 mg/kg·day, 0.003 to 3.75 mg/kg·day, 0.003 to 2.5 mg/kg·day, 0.003 to 2 mg/kg·day, 0.003 to 1.5 mg/kg·day, 0.003 to 1 mg/kg·day, 0.003 to 0.5 mg/kg·day, 0.003 to 0.1 mg/kg·day, 0.003 to 0.07 mg/kg·day, 0.005 to 3.75 mg/kg·day, 0.005 to 2.5 mg/kg·day, 0.005 to 2 mg/kg·day, 0.005 to 1.5 mg/kg·day, 0.005 to 1 mg/kg·day, 0.005 to 0.5 mg/kg·day, 0.005 to 0.1 mg/kg·day, 0.005 to 0.07 mg/kg·day, 0.01 to 3.75 mg/kg·day, 0.01 to 2.5 mg/kg·day, 0.01 to 2 mg/kg·day, 0.01 to 1.5 mg/kg·day, 0.01 to 1 mg/kg·day, 0.01 to 0.5 mg/kg·day, 0.01 to 0.1 mg/kg·day, 0.01 to 0.07 mg/kg·day, 0.025 to 3.75 mg/kg·day, 0.025 to 2.5 mg/kg·day, 0.025 to 2 mg/kg·day, 0.025 to 1.5 mg/kg·day, 0.025 to 1 mg/kg·day, 0.025 to 0.5 mg/kg·day, 0.025 to 0.1 mg/kg·day, 0.025 to 0.07 mg/kg·day, 0.05 to 3.75 mg/kg·day, 0.05 to 2.5 mg/kg·day, 0.05 to 2 mg/kg·day, 0.05 to 1.5 mg/kg·day, 0.05 to 1 mg/kg·day, 0.05 to 0.5 mg/kg·day, 0.05 to 0.1 mg/kg·day, 0.05 to 0.07 mg/kg·day, 0.1 to 3.75 mg/kg·day, 0.1 to 2.5 mg/kg·day, 0.1 to 2 mg/kg·day, 0.1 to 1.5 mg/kg·day, 0.1 to 1 mg/kg·day, 0.1 to 0.5 mg/kg·day, 0.15 to 3.75 mg/kg·day, 0.15 to 2.5 mg/kg·day, 0.15 to 2 mg/kg·day, 0.15 to 1.5 mg/kg·day, 0.15 to 1 mg/kg·day, 0.15 to 0.5 mg/kg·day, 0.3 to 3.75 mg/kg·day, 0.3 to 2.5 mg/kg·day, 0.3 to 2 mg/kg·day, 0.3 to 1.5 mg/kg·day, 0.75 to 3.75 mg/kg·day, 0.75 to 2.5 mg/kg·day, 0.75 to 2 mg/kg·day, 0.75 to 1.5 mg/kg·day, 1 to 3.75 mg/kg·day, 1 to 2.5 mg/kg·day, 1 to 2 mg/kg·day, or 1 to 1.5 mg/kg·day.

The first medicine of the present invention is suitable for continuous administration, because the adverse side effects are reduced. Furthermore, the first medicine of the present invention is also suitable for continuous administration, because the first medicine can be administered at a smaller dose. The period of administration of the first medicine of the present invention for a human body is, for example, 1 month or longer, preferably 3 months or longer. The first medicine of the present invention can be administered for an even longer period. Therefore, more preferred examples of the period of administration for a human body include 6 months or longer, preferably 1 year or longer, more preferably 1.5 years or longer, still more preferably 2 years or longer, further preferably 2.5 years or longer. The period of administration may be 3 years or longer. The upper limit of the period of administration for a human body is not particularly limited, and is, for example, 10 years or shorter, 8 years or shorter, 6 years or shorter, or 4 years or shorter. The upper limit of the period of administration may be 3 years or shorter. Specific examples of the period of administration include 1 month to 10 years, 1 month to 8 years, 1 month to 6 years, 1 month to 4 years, 1 month to 3 years, 3 months to 10 years, 3 months to 8 years, 3 months to 6 years, 3 months to 4 years, 3 months to 3 years, 6 months to 10 years, 6 months to 8 years, 6 months to 6 years, 6 months to 4 years, 6 months to 3 years, 1 to 10 years, 1 to 8 years, 1 to 6 years, 1 to 4 years, 1 to 3 years, 1.5 to 10 years, 1.5 to 8 years, 1.5 to 6 years, 1.5 to 4 years, 1.5 to 3 years, 2 to 10 years, 2 to 8 years, 2 to 6 years, 2 to 4 years, 2 to 3 years, 2.5 to 10 years, 2.5 to 8 years, 2.5 to 6 years, 2.5 to 4 years, 2.5 to 3 years, 3 to 10 years, 3 to 8 years, 3 to 6 years, and 3 to 4 years. The administration interval is every day, every other day, or once or twice per week, preferably every other day or every day, still more preferably every day.

[Subject to be Administered]

The first medicine of the present invention can be used for the prevention of a neurodegenerative disease and the treatment of a neurodegenerative disease.

Because the first medicine of the present invention is suitable for long-term administration, the first medicine can be used preferably for the prevention of a neurodegenerative disease. Examples of the neurodegenerative disease include Alzheimer's disease (AD), a tauopathy and a synucleinopathy. Examples of tauopathy include Pick's disease, corticobasal degeneration (CBD), frontotemporal lobar degeneration (FTLD) including progressive supranuclea palsy (PSP), and AD. Examples of the synucleinopathy include dementia with Lewy bodies (DLB), Parkinson's disease (PD), and multiple system atrophy (MSA) (preferably, dementia with Lewy bodies and Parkinson's disease). When the first medicine of the present invention is used for the prevention of a neurodegenerative disease, the subject to be administered is not particularly limited, as long as the subject is a non-progressor having a high onset risk. Examples of the non-progressor having a high onset risk include: as for AD, a normal person who is determined to be positive to the occurrence of senile plaques by amyloid imaging, and a member of a family having a family history of familial Alzheimer's disease; as for tauopathy, a normal person who is determined to be positive to the occurrence of tau inclusions by tau imaging, and a member of a family having a family history of familial tauopathy (e.g., FTDP-17); and as for synucleinopathy, a normal person who is determined to be positive to the occurrence of Lewy bodies by synuclein imaging, a normal person who is determined to have signal abnormality by dopamine transporter scintigraphy, and a member of a family having a family history of familial synucleinopathy (e.g., familial Parkinson's disease).

Furthermore, because the first medicine of the present invention has an extremely superior activity to remove an oligomer of a causative protein for a neurodegenerative disease, the first medicine can also be used for the treatment of a progressed neurodegenerative disease. When first medicine of the present invention is used for the treatment of synucleinopathy, the subject to be administered is not particularly limited, as long as the subject has been diagnosed to have synucleinopathy and is determined to require the inhibition of progression of a symptom of synucleinopathy (e.g., cognitive function) or the amelioration of the symptom. The first medicine of the present invention can be preferably applied to a patient having dementia with Lewy bodies.

[Pharmacological Activity]

The rifampicin compound is delivered to the brain upon administration, and can suppress the formation or aggregation of an oligomer of a causative protein for a neurodegenerative disease or remove the formed or aggregated oligomer of a causative protein for a neurodegenerative disease. As a result, the onset of the neurodegenerative disease can be delayed, or a symptom of the progressed neurodegenerative disease can be ameliorated (for example, the recovery from memory impairment due to the recovery of synapses).

Dendrites of an olfactory epithelial neuron reach nasal mucosa in an upper part of the nasal cavity, and information on odor which is received by an olfactory receptor located on the surfaces of the cells is delivered to olfactory bulbs in the brain through an axon of the olfactory epithelial neuron. There is no blood-brain barrier (BBB) between the nasal mucosa and the olfactory epithelial neuron. Although there is a cerebrospinal fluid around a nerve bundle in which axons of the present olfactory epithelial neuron are bundled, any blood-cerebrospinal fluid barrier (BCSFB) which inhibits mass exchange between blood and the cerebrospinal fluid is not present in this region, either. Therefore, when the first medicine of the present invention is administered transnasally, the rifampicin compound (an active ingredient) that reaches the nasal mucosa can be taken up by the olfactory epithelial neuron or the cerebrospinal fluid and can be delivered to the brain without being affected by BBB and BCSFB.

In this manner, when the first medicine of the present invention is administered transnasally, the direct delivery of the rifampicin compound to the brain can be improved and, therefore, the first pass to the liver can be suppressed. Therefore, in this case, the first medicine of the present invention is non-invasive with respect to the type of administration, can exert a still more improved high pharmacological effect due to the improved direct delivery to the brain, and can also exert a still more significant adverse-side-effect-suppressing effect due to the inhibition of the first pass to the liver.

[2. Prophylactic or Therapeutic Drug for Neurodegenerative Disease Containing Resveratrol Compound]

The second prophylactic or therapeutic drug of the present invention (also referred to as "the second medicine of the present invention", hereinafter) is characterized by being a medicine for transnasal administration which contains a resveratrol compound selected from the group consisting of resveratrol and a derivative of resveratrol and can be used for the prevention or treatment of a neurodegenerative disease at a specified dose. The second medicine of the present invention contains the resveratrol compound as a single agent. In the second medicine of the present invention, the wording "the resveratrol compound is contained as a single agent" means that the resveratrol compound is not used in combination with the rifampicin compound in order to distinguish the second medicine of the present invention from the first medicine of the present invention, wherein the addition of other pharmacological active components is acceptable.

[Resveratrol Compound]

The second medicine of the present invention contains a resveratrol compound selected from the group consisting of resveratrol and a derivative thereof. The resveratrol compound used in the second medicine of the present invention can exhibit, for example, an effect to remove an oligomer of a causative protein for a neurodegenerative disease slowly and improve the cognitive function when administered transnasally continuously at a low dose.

The details about the resveratrol compound are as described in the section "1. Prophylactic or therapeutic drug for neurodegenerative disease containing combination of rifampicin compound and resveratrol compound". The content of the resveratrol compound in the second medicine of the present invention is as described with respect to the content of the resveratrol compound in the first medicine in the section "1. Prophylactic or therapeutic drug for neurodegenerative disease containing combination of rifampicin compound and resveratrol compound".

[Dosage Form]

The dosage form of the second medicine of the present invention is the same as the dosage form of the first medicine as described in the section "1. Prophylactic or therapeutic drug for neurodegenerative disease containing combination of rifampicin compound and resveratrol compound".

[Usage/Dose]

The second medicine of the present invention is prepared in a form suitable for transnasal administration in order to achieve an efficacy on a neurodegenerative disease patient sat a specified low dose. The dose of the second medicine of the present invention for a human body is such that the dose of the resveratrol compound is 0.28 mg/kg·day or less. The second medicine of the present invention can exert the pharmacological effect thereof slowly even at a low dose. Therefore, the dose of the resveratrol compound may be 0.24 mg/kg·day or less, 0.2 mg/kg·day or less, 0.15 mg/kg·day or less, 0.1 mg/kg·day or less, 0.08 mg/kg·day or less, or 0.06 mg/kg·day or less.

From the viewpoint that the pharmacological effect can be exerted, the lower limit of the dose of the resveratrol compound in the second medicine of the present invention is, for example, 0.01 mg/kg·day or more, preferably 0.025 mg/kg·day or more, more preferably 0.05 mg/kg·day or more, still more preferably 0.1 mg/kg·day or more, further preferably 0.2 mg/kg·day or more, especially preferably 0.25 mg/kg·day or more.

More specifically, the range of the dose of the resveratrol compound in the second medicine of the present invention is 0.01 to 0.28 mg/kg·day, 0.01 to 0.24 mg/kg·day, 0.01 to 0.2 mg/kg·day, 0.01 to 0.15 mg/kg·day, 0.01 to 0.1 mg/kg·day, 0.01 to 0.08 mg/kg·day, 0.01 to 0.06 mg/kg·day, 0.025 to 0.28 mg/kg·day, 0.025 to 0.24 mg/kg·day, 0.025 to 0.2 mg/kg·day, 0.025 to 0.15 mg/kg·day, 0.025 to 0.1 mg/kg·day, 0.025 to 0.08 mg/kg·day, 0.025 to 0.06 mg/kg·day, 0.05 to 0.28 mg/kg·day, 0.05 to 0.24 mg/kg·day, 0.05 to 0.2 mg/kg·day, 0.05 to 0.15 mg/kg·day, 0.05 to 0.1 mg/kg·day, 0.05 to 0.08 mg/kg·day, 0.05 to 0.06 mg/kg·day, 0.1 to 0.28 mg/kg·day, 0.1 to 0.24 mg/kg·day, 0.1 to 0.2 mg/kg·day, 0.1 to 0.15 mg/kg·day, 0.2 to 0.28 mg/kg·day, 0.2 to 0.24 mg/kg·day, or 0.25 to 0.28 mg/kg·day.

The second medicine of the present invention can be administered about 1 to 4 times per day in such a manner that the resveratrol compound can be administered at the above-mentioned dose. The period of administration to a human body is, for example, 1 month or longer, preferably 3 months or longer, more preferably 6 months or longer, still more preferably 1 year or longer, further preferably 1.5 years or longer. The first medicine of the present invention can be administered for a considerably long period. Therefore, more preferably, the period of administration to a human body is, for example, 2.5 years or longer, further preferably 2.8 years or longer, especially preferably 3 years or longer. The upper limit of the period of administration to a human body is not particularly limited, and is, for example 10 years or shorter, 8 years or shorter, 6 years or shorter, or 4 years or shorter. More specifically, the period of administration is 1 month to 10 years, 1 month to 8 years, 1 month to 6 years, 1 month to 4 years, 3 months to 10 years, 3 months to 8 years, 3 months to 6 years, 3 months to 4 years, 6 months to 10 years, 6 months to 8 years, 6 months to 6 years, 6 months to 4 years, 1 to 10 years, 1 to 8 years, 1 to 6 years, 1 to 4 years, 1.5 to 10 years, 1.5 to 8 years, 1.5 to 6 years, 1.5 to 4 years, 2 to 10 years, 2 to 8 years, 2 to 6 years, 2 to 4 years, 2.5 to 10 years, 2.5 to 8 years, 2.5 to 6 years, 2.5 to 4 years, 3 to 10 years, 3 to 8 years, 3 to 6 years, or 3 to 4 years. The administration interval is every day, every other day, or once or twice per week. The administration interval is every day, every other day, or once or twice per week, preferably every other day or every day, still more preferably every day.

[Subject for Administration]

The second medicine of the present invention can be used for the prevention of a neurodegenerative disease and the treatment of a neurodegenerative disease.

The subject for the administration of the second medicine of the present invention is the same as that described in the section "1. Prophylactic or therapeutic drug for neurodegenerative disease containing combination of rifampicin compound and resveratrol compound".

Particularly, the second medicine of the present invention can be used preferably for the prevention of Alzheimer's disease (AD). In this case, specific examples of the subject to be administered include: a normal person who is determined to be positive to the occurrence of senile plaques by amyloid imaging; and a member of a family having a family history of familial Alzheimer's disease. In addition, the second medicine of the present invention can also be used for the purpose of ameliorating a symptom associated with the decline of a brain function, more specifically the amelioration of cognitive function (e.g., memory loss). In this case, specific examples of the subject to be administered include: a person who has the decline of a brain function, more specifically a person who has the decline of cognitive function; and a person who requests the suppression or improvement of the decline of aging-related cognitive function.

[3. Brain Function Improving Food Containing Resveratrol Compound]

The brain function improving food of the present invention is characterized by containing a resveratrol compound selected from the group consisting of resveratrol and a derivative of resveratrol and being used for the improvement of a brain function at a specified dose. The brain function improving food of the present invention contains the resveratrol compound in the form of a single agent. The wording "the resveratrol compound is contained in the form of a single agent in the brain function improving food of the present invention" has the same meaning as the wording "the resveratrol compound is contained in the form of a single agent in the second medicine of the present invention".

[Resveratrol Compound]

The brain function improving food of the present invention contains a resveratrol compound selected from the group consisting of resveratrol and a derivative thereof. When the resveratrol compound in the brain function improving food of the present invention is taken continuously at a low dose, the resveratrol compound can exert an effect to improve cognitive function or the like, although the resveratrol compound is a single agent.

Details about the resveratrol compound are as described in the section "1. Prophylactic or therapeutic drug for neurodegenerative disease containing combination of rifampicin compound and resveratrol compound". The content of the resveratrol compound in the brain function improving food of the present invention is the same as the content of the resveratrol compound in the first medicine as described in the section "1. Prophylactic or therapeutic drug for neurodegenerative disease containing combination of rifampicin compound and resveratrol compound".

[Dosage Form]

The dosage form of the brain function improving food of the present invention may have a liquid form or a solid form. Examples of the liquid form include a liquid preparation, a beverage, an emulsion, a suspension, a spirit, a syrup, and an elixir (including a soft extract), and examples of the solid form include tablets, pills, a powder, subtle granules, granules, tablets, capsules (including hard capsules and soft capsules), a pastille, a chewable agent, and a dry extract.

The brain function improving food of the present invention can be used as a general food (including a beverage), a food with health claims (including a food for specified health uses, a food with nutrient function claims and a supplement), a medical food, a medicine or a quasi drug, and can also be used as an additive or the like for other foods, medicines, quasi drugs and others.

The brain function improving food of the present invention may contain at least one sitologically or pharmaceutically acceptable excipient, disintegrating agent, diluting agent, lubricating agent, perfuming agent, perfuming agent, coloring agent, sweetening agent, flavoring agent, suspending agent, moisturizing agent, emulsifying agent, dispersing agent, adjuvant, antiseptic agent, buffering agent, binder, stabilizing agent, bulking agent, thickening agent, pH adjusting agent, surfactant, coating agent, nutrient ingredient or the like, depending on the type of the dosage form thereof.

[Usage/Dose]

The amount of intake of the brain function improving food of the present invention in a human body is such that the amount of intake of the resveratrol compound can become 3.75 mg/kg·day or less. Because the brain function improving food of the present invention can exert the pharmacological effect thereof slowly even at a low dose, the amount of intake of the resveratrol compound may be 2.5 mg/kg·day or less, 2 mg/kg·day or less or 1.5 mg/kg·day or less.

From the viewpoint the development of the brain function-improving effect, the lower limit of the amount of intake of the resveratrol compound in the brain function improving food of the present invention is 0.1 mg/kg·day or more, preferably 0.15 mg/kg·day or more, more preferably 0.3 mg/kg·day or more, still more preferably 0.75 mg/kg·day or more, further preferably 1 mg/kg·day or more.

More specifically, the range of the amount of intake of the resveratrol compound in the brain function improving food of the present invention is 0.1 to 3.75 mg/kg·day, 0.1 to 2.5 mg/kg·day, 0.1 to 2 mg/kg·day, 0.1 to 1.5 mg/kg·day, 0.15 to 3.75 mg/kg·day, 0.15 to 2.5 mg/kg·day, 0.15 to 2 mg/kg·day, 0.15 to 1.5 mg/kg·day, 0.3 to 3.75 mg/kg·day, 0.3 to 2.5 mg/kg·day, 0.3 to 2 mg/kg·day, 0.3 to 1.5 mg/kg·day, 0.75 to 3.75 mg/kg·day, 0.75 to 2.5 mg/kg·day, 0.75 to 2 mg/kg·day, 0.75 to 1.5 mg/kg·day, 1 to 3.75 mg/kg·day, 1 to 2.5 mg/kg·day, 1 to 2 mg/kg·day, or 1 to 1.5 mg/kg·day.

The brain function improving food of the present invention can be taken about 1 to 4 times per day in such an amount that the dose of the resveratrol compound can become the above-mentioned dose. The period of intake for a human body is, for example, 1 month or longer, preferably 3 months or longer, more preferably 6 months or longer, still more preferably 1 year or longer, further preferably 1.5 years or longer. The brain function improving food of the present invention can be taken for a considerably long period. Therefore, more preferably, the period of intake for a human body is, for example, preferably 2.5 years or longer, still more preferably 2.8 years or longer, further preferably 3 years or longer. The upper limit of the period of intake for a human body is not particularly limited, and is, for example 10 years or shorter, 8 years or shorter, 6 years or shorter, or 4 years or shorter. More specifically, the period of intake is 1 month to 10 years, 1 month to 8 years, 1 month to 6 years, 1 month to 4 years, 3 months to 10 years, 3 months to 8 years, 3 months to 6 years, 3 months to 4 years, 6 months to 10 years, 6 months to 8 years, 6 months to 6 years, 6 months to 4 years, 1 to 10 years, 1 to 8 years, 1 to 6 years, 1 to 4 years, 1.5 to 10 years, 1.5 to 8 years, 1.5 to 6 years, 1.5 to 4 years, 2 to 10 years, 2 to 8 years, 2 to 6 years, 2 to 4 years, 2.5 to 10 years, 2.5 to 8 years, 2.5 to 6 years, 2.5 to 4 years, 3 to 10 years, 3 to 8 years, 3 to 6 years, 3 to 4 years. The intake interval is every day, every other day, or once or twice per week, preferably every other day or every day, still more preferably every day.

[Subject of Intake]

The brain function improving food of the present invention can be used for ameliorating a symptom associated with the decline of a brain function, more specifically for improving cognitive function (e.g., memory loss). In this case, a specific example of the subject of intake is a person who has had the decline of a brain function, more specifically a person who has had the decline of cognitive function and a person who requires the suppression or improvement of the age-related decline of cognitive function. The brain function improving food of the present invention can also be used for preventing or ameliorating fatigue associated with the use of a brain function.

More specific examples of the subject for the ingestion of the brain function improving food of the present invention include: a middle- and oil-aged person who requests the improvement of memory loss; a person who requests the improvement of memory loss increased with age; a person who requests the maintenance of memory ability (i.e., an ability to store and recall behaviors and judged matters in daily life) that is declined with age; a person who requests the maintenance of attentiveness (i.e., an ability to sustain attention to keep a single behavior) that is decreased with age; and a person who requests the improvement in accuracy of memory (i.e., recall of a perceived/recognized matter) that is declined with age; and others. An additional more specific example of the subject for the ingestion of the brain function improving food of the present invention is a person who requests the reduction in fatigue in brain, the clarity of brain, the calming of brain, the support of functioning of brain, or the like.

EXAMPLES

The present invention will be described more specifically by way of examples. However, the present invention is not limited by these examples.

Test Example 1 (for Reference)

Each of administration compositions each containing or not containing rifampicin was administered to Alzheimer's disease model mice shown in Table 1 every day for 1 month at a dose and usage shown in Table 1.

(Subjects of Administration)

Eleven-month-old male $APP_{OSK}$ mice (Tomiyama et al. J Neurosci. 2010; 30: 4845-56) were provided. The body weight of each of the $APP_{OSK}$ mice was about 30 g. Sixty $APP_{OSK}$ mice were divided into five groups A to E each including 12 mice. Separately, 12 wild-type mice (non-Tg littermate) of the same month old were provided. The $APP_{OSK}$ mice were amyloid precursor protein (APP) transgenic mice (Alzheimer's disease models), and had accumulation of amyloid-β (Aβ) protein.

(Administration Compositions)

In a 0.5-w/v % aqueous sodium carboxymethylcellulose (CMC; Sigma-Aldrich, Carboxymethylcellulose sodium salt low viscosity, C5678) solution (also referred to as "CMC", hereinafter) was suspended rifampicin drug (RFP; Sigma-Aldrich, Rifampicin ≥97% (HPLC), powder, another name: 3-(4-methylpiperazinyliminomethyl)rifamycin SV, rifampicin AMP, rifampin, R3501) in such an amount that each of the doses shown in Reference Working Examples 1 to 4 in Table 1 could be achieved. In this manner, administration compositions were prepared. With respect to Reference Examples 1 to 2, administration compositions were prepared in the same manner as mentioned above, except that the rifampicin drug was not contained.

(Administration Methods)

For oral administration, an oral sound for rodents was used; for transnasal administration, pipetman (white tip) was used; and for subcutaneous administration, an injection syringe was used. All of these administrations were carried out under non-anesthesia.

TABLE 1

|  | Reference Example 1 | Reference Example 2 | Reference Working Example 1 | Reference Working Example 2 | Reference Working Example 3 | Reference Working Example 4 |
|---|---|---|---|---|---|---|
| Dose/day | 300 μl CMC | 10 μl CMC | RFP 0.25 mg/ 300 μl CMC | RFP 0.25 mg/ 10 μl CMC | RFP 0.05 mg/ 10 μl CMC | RFP 0.25 mg/ 300 μl CMC |
| Usage | Oral | Transnasal | Oral | Transnasal | Transnasal | Subcutaneous |
| Subject of administration | Non-Tg (wild type) | $APP_{OSK}$ | $APP_{OSK}$ | $APP_{OSK}$ | $APP_{OSK}$ | $APP_{OSK}$ |

(Result 1—Behavioral Test (Cognitive Function))

The mice (12-month-old) after the completion of the administration were subjected to a behavioral test, and the effects of rifampicin on the cognitive function of the mice was compared. The behavioral test was carrying out by determining the spatial reference memory of each of the mice using a Morris water maze in accordance with the method described in Umeda et al. Brain 2016; 139: 1568-86. The mice to be subjected to the behavioral test were as follows: 12 mice (Reference Working Example 1, Reference Working Example 2, Reference Working Example 3), 11 mice (Reference Example 1, Reference Example 2, Reference Working Example 4), excluding mice dead during the administration.

The results of the behavioral test are shown in FIG. 1. In all of the oral administration (oral), the transnasal administration (intranasal) and the subcutaneous administration (subcutaneous), the improvement of memory impairment in the $APP_{OSK}$ mice was confirmed. However, in the case of oral administration (Reference Working Example 1), the improvement effect was insufficient. In contrast, in each of the case of transnasal administration (Reference Working Example 2 and Reference Working Example 3) and the case of subcutaneous administration (Reference Working Example 4), the improvement effect was at the same level as that in the wild-type mice. Furthermore, in the case of transnasal administration, even when the dose was reduced to 1/5 (0.05 mg/day) (Reference Working Example 3), it was confirmed that the improvement effect was higher than that in the case of oral administration (Reference Working Example 1).

(Result 2—Hepatic Dysfunction)

Blood was collected from each of the mice after the completion of the behavioral test, and then serum was separated from the blood to prepare a serum sample. Liver enzymes AST (GOT) and ALT (GPT) in the serum sample were measured, and comparison was made with respect to the degree of hepatic dysfunction caused by rifampicin.

The results of the measurement of the liver enzymes are shown in Table 2. Compared with the CMC-administered $APP_{OSK}$ mice (Reference Example 2), the RFP-administered mice (Reference Working Example 1) showed significant increase in AST level, and therefore the development of hepatotoxicity was suggested. In contrast, in the transnasally administered mice (Reference Working Example 2, Reference Working Example 3), a significant AST-decreasing tendency was observed compared with Reference Working Example 1. Particularly in the mice which had been transnasally administered at a lower dose (Reference Working Example 3), a further more significant AST-decreasing tendency was observed. In the case of subcutaneous administration (Reference Working Example 4), the increase in AST level was not observed. With respect to ALT, any significant change was not observed in all of the administration methods.

TABLE 2

|  | Reference Example 1 | Reference Example 2 | Reference Working Example 1 | Reference Working Example 2 | Reference Working Example 3 | Reference Working Example 4 |
|---|---|---|---|---|---|---|
|  |  |  | $APP_{OSK}$ | | | |
|  |  |  | Rifampicin (mg/day) | | | |
|  | Non-Tg CMC Oral n = 10 | CMC Transnasal n = 9 | 0.25 Oral n = 12 | 0.25 Transnasal n = 12 | 0.05 Transnasal n = 11 | 0.25 Subcutaneous n = 10 |
| AST | 74 ± 5 | 104 ± 13 | 248 ± 56* | 189 ± 25 | 165 ± 32 | 72 ± 6 |
| ALT | 29 ± 1 | 35 ± 3 | 39 ± 5 | 45 ± 5 | 40 ± 10 | 29 ± 2 |

A numerical value for each of AST and ALT was expressed in Mean ± SEM (IU/L).
*With respect to AST values in Non-Tg mice, CMC-administered Tg mice and subcutaneously administered Tg mice, the p value (in accordance with Tukey-Kramer test) of the difference among the groups was $p < 0.05$.
In C57BL6 mice, the normal values for AST and ALT were 68 ± 24 and 30 ± 8, respectively.

(Results 3—Immunohistochemical Staining (Brain Pathology))

The brain was removed from each of the mice after the completion of the behavioral test, and comparison was made with respect to the effect of rifampicin on Aβ oligomers, synaptophysin and phosphorylated tau by immunohistochemical staining.

Each of Aβ oligomers (Aβ oligomers have been believed to cause the phosphorylation of tau and the decrease in synaptophysin), synaptophysin (a marker protein for a synapse) and phosphorylated tau was stained by an immunohistochemical staining method in accordance with the procedure described in Umeda et al. Brain 2016; 139: 1568-86. For the staining of the Aβ oligomers, 11A1 antibody (Immuno-Biological Laboratories Co, Ltd.) was used; for the staining of synaptophysin, SVP-38 antibody (Sigma) was used; and for the staining of phosphorylated tau, mouse monoclonal PHF-1 antibody (an anti-p-Ser396/404-tau antibody, provided by Peter Davies, Ph. d., Albert Einstein College of Medicine). After the staining, each of the Aβ oligomers, synaptophysin and phosphorylated tau was quantified using NIH image-J.

Figure 2:
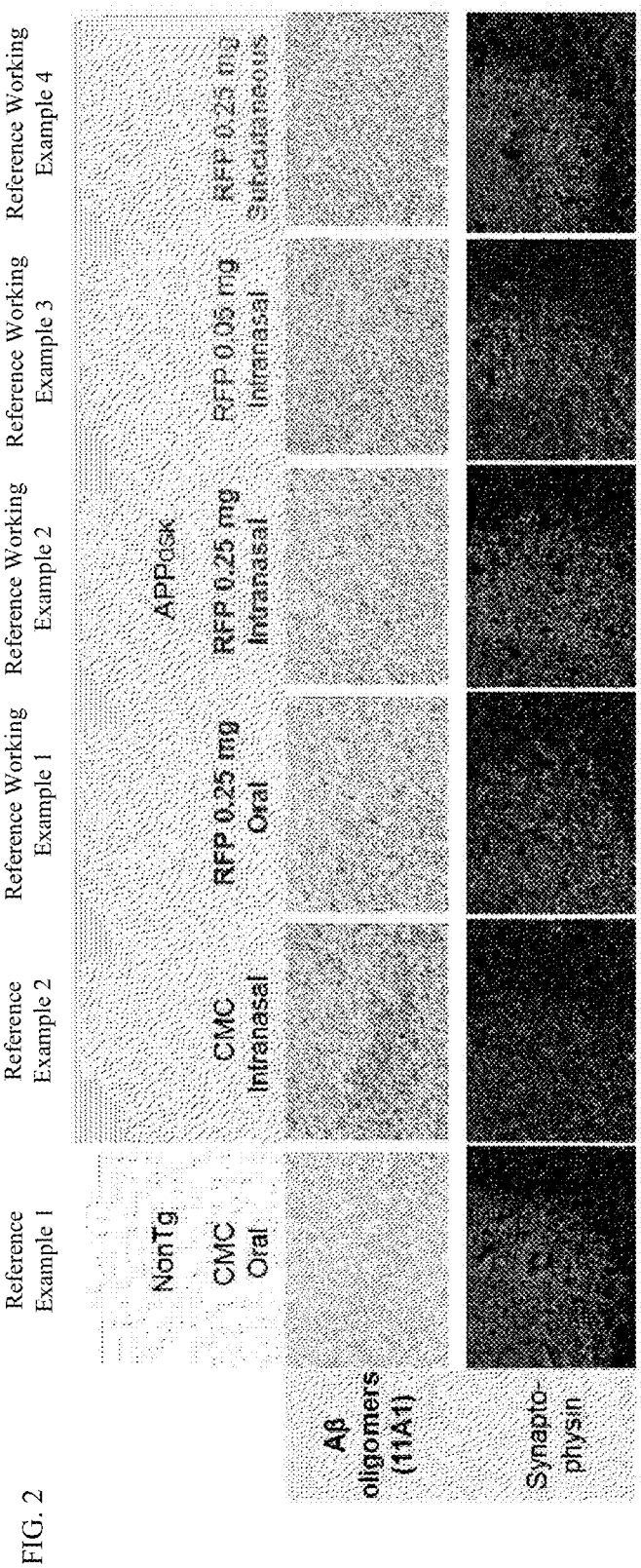
FIG. 2 shows the results of immunostaining carried out in Test Example 1, which demonstrate an Aβ oligomer removing effect and a synaptophysin recovery effect by rifampicin.

The photographs of the tissues after the immunostaining of the Aβ oligomers and synaptophysin are shown in FIG. 2. In FIG. 2, the upper column shows hippocampal CA3 tissues and the lower column shows hippocampal CA2/3 tissues. In each of the oral administration (Reference Working Example 1), the transnasal administration (Reference Working Example 2, Reference Working Example 3) and the subcutaneous administration (Reference Working Example 4) of RFP, the Aβ oligomers accumulated in the brain were decreased, while the decreased synaptophysin was recovered.

Figure 3:
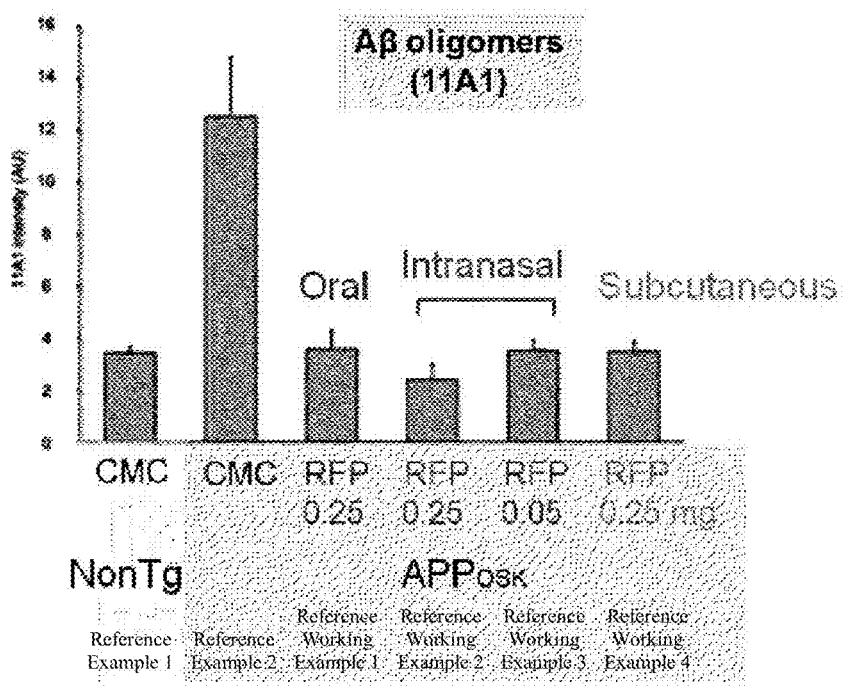
FIG. 3 shows the results of the quantification of Aβ oligomers based on the immunostaining shown in FIG. 2.

The results of the quantification of Aβ oligomers which were obtained from the immunostaining results shown in FIG. 2 are shown in FIG. 3. In each of the oral administration (Reference Working Example 1), the transnasal administration (Reference Working Example 2, Reference Working Example 3), and the subcutaneous administration (Reference Working Example 4) of RFP, Aβ oligomers were reduced to at least the same level as in the wild-type mice (Reference Example 1). When comparison was made at the same dose, the highest reduction effect due to the removal of Aβ oligomers was observed in the transnasal administration (Reference Working Example 2).

Figure 4:
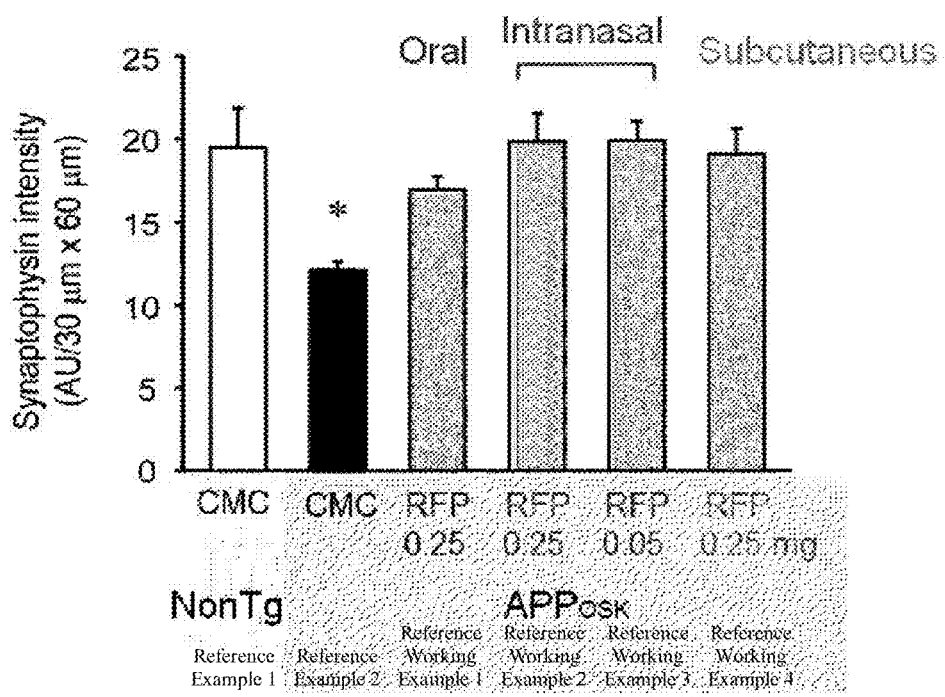
FIG. 4 shows the results of the quantification of synaptophysin based on the immunostaining shown in FIG. 2.

The results of the quantification of synaptophysin which were obtained from the immunostaining results shown in FIG. 2 are shown in FIG. 4. In each of the oral administration (Reference Working Example 1), the transnasal administration (Reference Working Example 2, Reference Working Example 3), and the subcutaneous administration (Reference Working Example 4) of RFP, synaptophysin in the hippocampus showed a recovery tendency. Particularly, the effect obtained in the case of the oral administration (Reference Working Example 1) was poor, while the recovery observed in each of the case of transnasal administration (Reference Working Example 2, Reference Working Example 3) and the case of subcutaneous administration (Reference Working Example 4) was the same level as that in the wild-type mice (Reference Example 1). Furthermore, like the results of the behavioral test, in the case of the transnasal administration, it was confirmed that the effect was higher than that in the oral administration (Reference Working Example 1) even when the dose was reduced to ⅕ (0.05 mg/day) (Reference Working Example 3).

Figure 5:
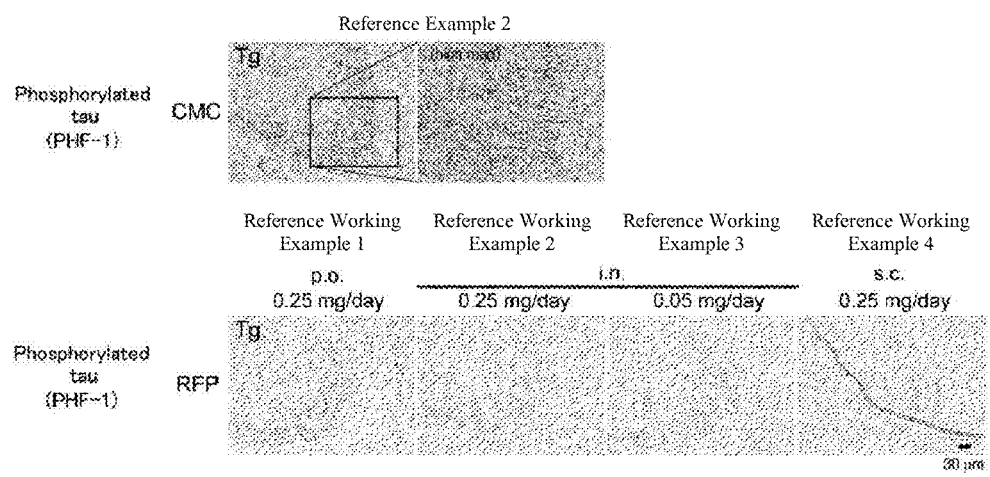
FIG. 5 shows the results of immunostaining carried out in Test Example 1, which demonstrate a phosphorylated tau removing effect by rifampicin.

Photographs of tissues after the immunostaining of phosphorylated tau are shown in FIG. 5. FIG. 5 shows hippocampal CA2/3 tissues. In all of the oral administration (Reference Working Example 1), the transnasal administration (Reference Working Example 2, Reference Working Example 3) and the subcutaneous administration (Reference Working Example 4) of RFP, the amount of phosphorylated tau accumulated in the brain was decreased.

Figure 6:
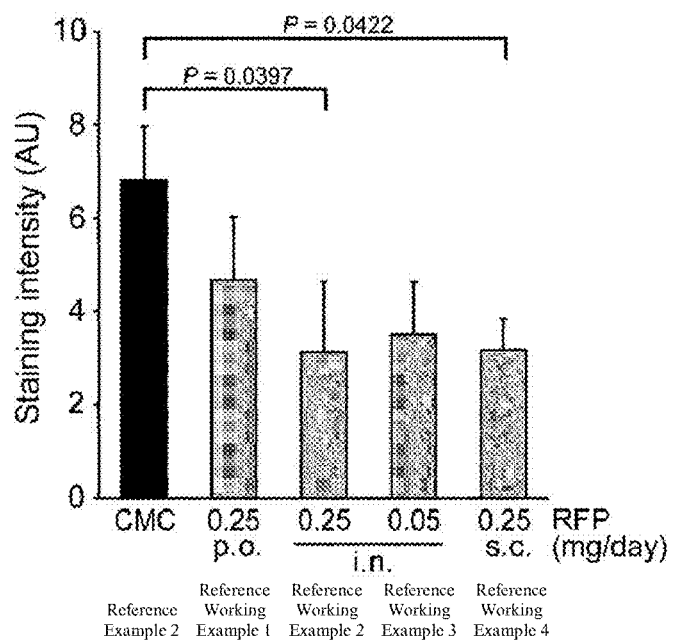
FIG. 6 shows the results of the quantification of phosphorylated tau based on the immunostaining shown in FIG. 5.

The results of the quantification of phosphorylated tau which were obtained from the results of the immunostaining shown in FIG. 5 are shown in FIG. 6. In all of the oral administration (Reference Working Example 1), the transnasal administration (Reference Working Example 2, Reference Working Example 3), and the subcutaneous administration (Reference Working Example 4) of RFP, phosphorylated tau in the hippocampus showed a decreasing tendency. Particularly, the effect by the oral administration (Reference Working Example 1) was poor, while the effect by each of the transnasal administration (Reference Working Example 2, Reference Working Example 3) and the subcutaneous administration (Reference Working Example 4) was high. When comparison was made at the same dose, the reduction effect by the removal of phosphorylated tau was highest in the transnasal administration (Reference Working Example 2).

From the above-mentioned results, it was demonstrated that, in the administration of rifampicin, the transnasal administration was more superior than the oral administration because of a higher pharmacological effect and reduced adverse side effects, and was more superior than the subcutaneous administration because of the non-invasiveness thereof. The period of administration of 1 month for a mouse which induced these results corresponds to about 3.3 years for a human body. Therefore, it was demonstrated that the transnasal administration of rifampicin was suitable for a long-term administration and therefore was suitable for the treatment of dementia as well as the prevention of dementia.

The extrapolation of an effective amount in a mouse into an effective amount in a human body can be performed appropriately with taking the difference in size, shape and function of nose, nasal mucosa and olfactory nerve into consideration. In the above-mentioned Reference Working Examples, it was demonstrated that transnasal doses of 0.05 mg/mouse/day (1.67 mg/kg·day) and 0.25 mg/mouse/day (8.33 mg/kg·day) per mouse (body weight: about 30 g) were effective doses. From the obtained results, it was expected that the effect might be exerted at a dose of about 1/10 of each of the doses. In addition, it was also considered that the administration for a longer period was possible. Therefore, with taking this possibility of the longer-term administration into consideration, it was expected that the effect could be achieved even at a more smaller dose (e.g., 0.15 mg/kg·day). On the other hand, the preparation was formulated in such a manner that the oral dose of rifampicin in a human body became 450 to 600 mg/60 kg·day (7.5 to 10 mg/kg·day), and the effect was exerted even at a smaller transnasal administration dose, i.e., an amount of ⅕ of the oral dose, in the above-mentioned Reference Working Examples. In view of these facts, it was considered that, in the administration to a human body, a dose of ½ of the conventionally employed dose (e.g., 3.75 mg/kg·day) might be effective obviously. For these reasons, in the administration to a human body, a dose of 0.15 to 3.75 mg/kg·day was deemed as an effective dose. Furthermore, as mentioned in Test Example 2 below, the transnasal administration of rifampicin was suitable for the prevention or treatment of synucleinopathy, and therefore this dose could also be deemed as an effective dose for synucleinopathy.

Test Example 2 (for Reference)

Each of administration compositions each containing or not containing rifampicin was administered to synucleinopathy model mice shown in Table 3 every day for 1 month at a dose and usage shown in Table 3.
(Subjects of Administration)

As synucleinopathy models, α-synuclein transgenic (αSyn-Tg) mice each having an A53T mutation were purchased from Jackson Laboratories. The mice showed movement impairment at the age of about 9 months or later and have been reported as models for Parkinson's disease (wherein the mice are also referred to as "αSyn-Tg 9 mo mice", hereinafter) (Lee et al. Proc Natl Acad Sci USA. 2002; 99: 8968-73). However, as mentioned below, the present inventors had studied in detail and it was found that the mice showed cognitive function disorder at the age of 6 months or later, although the motor function of the mice was normal and it was also found that the mice at the age of about 6 months to about 9 months could be used as models for dementia with Lewy bodies (wherein the models are also referred to as "αSyn-Tg 6 mo mice", hereinafter). Therefore, in this Test Example, αSyn-Tg 6 mo mice and αSyn-Tg 9 mo mice were used as the subjects of administration.

Figure 7:
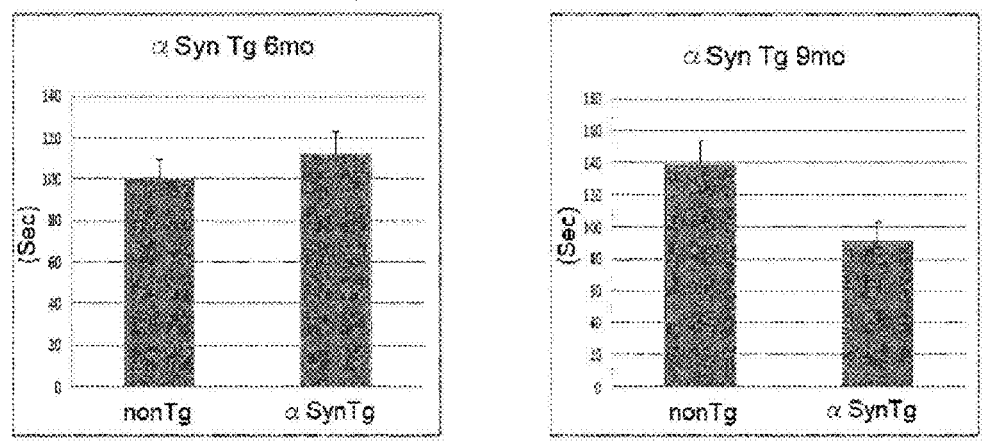
FIG. 7 shows the results of the motor function test on αSyn-Tg 6-month-age (6 mo) mice used in Test Example 2.
Figure 8:
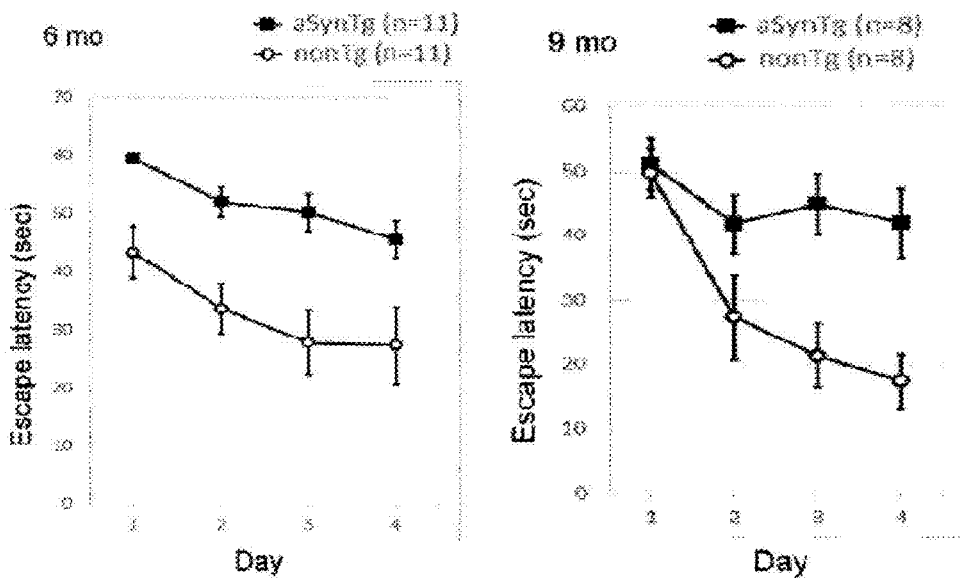
FIG. 8 shows the results of the cognitive function test on αSyn-Tg 9-month-age (9 mo) mice used in Test Example 2.

The motor function and the cognitive function of each of the model mice were confirmed by a motor function test and a cognitive function test as mentioned below. The motor function test was carried out using a rotarod. Each of the mice was placed on a rotor which could rotate at a speed of 5 rpm (5 rotations per minute), was then subjected to such a training that the mouse was allowed to walk on the rotor for 3 minutes, and was then placed on a rotor of which the speed of rotation could increase from 4 rpm to 40 rpm over 4 minutes, and the time (seconds) until the mouse fell off the rotor was measured (when the mouse was turned once while holding on to the rotor, it was deemed that the mouse fell off). The measurement was carried out twice per day, and an average value of the measurement values was determined. The cognitive function test was carried out in accordance with the method described in Umeda et al. Brain 2016; 139: 1568-86 by measuring the spatial reference memory of the mice using a Morris water maze (the cognitive function test in the below-mentioned examples was carried out in the same manner as in this Test Example). The results of the motor function test are shown in FIG. 7, and the results of the cognitive function test are shown in FIG. 8. As shown in FIG. 7 and FIG. 8, the αSyn-Tg 6 mo mice did not show abnormality in motor function and were deteriorated in cognitive function, and therefore it was found that the mice could be used as models for dementia with Lewy bodies (DLB). The αSyn-Tg 9 mo mice showed accumulation of α-synuclein and were deteriorated in both of motor function and cognitive function as mentioned below, and therefore could be used as Parkinson's disease (PD) models.

(Administration Compositions)

In a 0.5-w/v % aqueous sodium carboxymethylcellulose (CMC; Sigma-Aldrich, Carboxymethylcellulose sodium salt low viscosity, C5678) solution (also referred to as "CMC", hereinafter) was suspended rifampicin drug (RFP; Sigma-Aldrich, Rifampicin ≥97% (HPLC), powder, another name: 3-(4-methylpiperazinyliminomethyl)rifamycin SV, rifampicin AMP, rifampin, R3501) in such an amount that each of the doses shown in Reference Working Examples 5 to 6 in Table 3 could be achieved. In this manner, administration compositions were prepared. With respect to Reference Examples 4 to 5, administration compositions were prepared in the same manner as mentioned above, except that the rifampicin drug was not contained.

(Administration Methods)

The transnasal administration was carried out in the same manner as in Test Example 1.

Example 5), the improvement of memory impairment was observed from day 1 after the administration, and the cognitive function was recovered to the same level as that in normal Non-Tg mice (Reference Example 4) from day 4 after the administration. That is, it was demonstrated that the effect of rifampicin to remove α-synuclein was high so that the cognitive function was recovered to a normal level. Furthermore, in Reference Working Example 5, like Test Example 1, rifampicin was transnasally administered and the adverse side effects on hepatic dysfunction were significantly reduced. In addition, in Reference Working Example 5, the dose of rifampicin was as low as 0.1 mg/day/mouse and therefore the adverse side effects on hepatic dysfunction were more significantly reduced.

(Result 2—Western Blotting (Brain Pathology))

The brain was removed from each of the αSyn-Tg 9 mo mice, and comparison was made with respect to the effect of rifampicin on an α-synuclein oligomer by western blotting.

The brain was weighed, and then buffer A (Masuda-Suzukake et al. Acta Neuropathol Commun. 2014; 2: 88) in a volume 5-fold larger than the weight of the brain (wherein "1 g" was deemed as "1 mL") was added to the brain to prepare a homogenate by sonication. The homogenate was centrifuged at 100,000 g and 4° C. for 30 minutes. A centrifuged supernatant was collected, an equal volume of 2×SDS sample buffer was added thereto, and the resultant solution was boiled for 5 minutes. The resultant sample was electrophoresed on a 12%-acrylamide gel and was then transferred to Immobilon-P membrane (Merck Millipore, IPVH304F0). The membrane was reacted with an anti-α-synuclein antibody (Santa Cruz Biotechnology, sc-58480) and a HRP (horse radish peroxidase)-anti-mouse IgG antibody (Bio-Rad Laboratories, 170-6516), and ImmunoStar LD (Wako Pure Chemical Industries, Ltd., 290-69904) was added thereto as a substrate, and a band of α-synuclein was visualized with ImageQuant LAS 500 (GE Healthcare Japan). The quantification of the band was carried out using Multi Gauge Ver2.0 (FUJIFILM Corporation).

Figure 10:
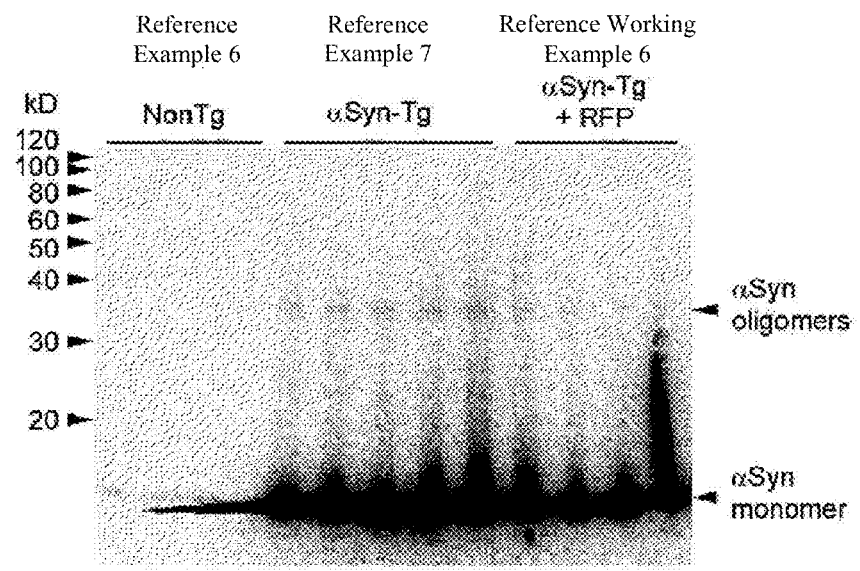
FIG. 10 shows the results of western blotting carried out in Test Example 2, which demonstrate the effect of rifampicin on α-synuclein.

The results of the western blotting are shown in FIG. 10. As shown in FIG. 10, in the αSyn-Tg mice (Reference Example 7), and α-synuclein oligomer, which was not observed in the normal Non-Tg mice (Reference Example 6), was observed. However, in the αSyn-Tg mice (Reference

TABLE 3

|  | Reference Example 4 | Reference Example 5 | Reference Working Example 5 | Reference Example 6 | Reference Example 7 | Reference Working Example 6 |
|---|---|---|---|---|---|---|
| Dose/day | 10 μl CMC | 10 μl CMC | RFP 0.1 mg/ 10 μl CMC | — | — | RFP 0.25 mg/ 10 μl CMC |
| Usage | Transnasal | Transnasal | Transnasal | — | — | Transnasal |
| Subject of administration | Non-Tg (wild type) | αSyn-Tg 6 mo (DLB) | αSyn-Tg 6 mo (DLB) | Non-Tg (wild type) | αSyn-Tg 9 mo (PD) | αSyn-Tg 9 mo (PD) |

(Result 1—Behavioral Test (Cognitive Function))

Figure 9:
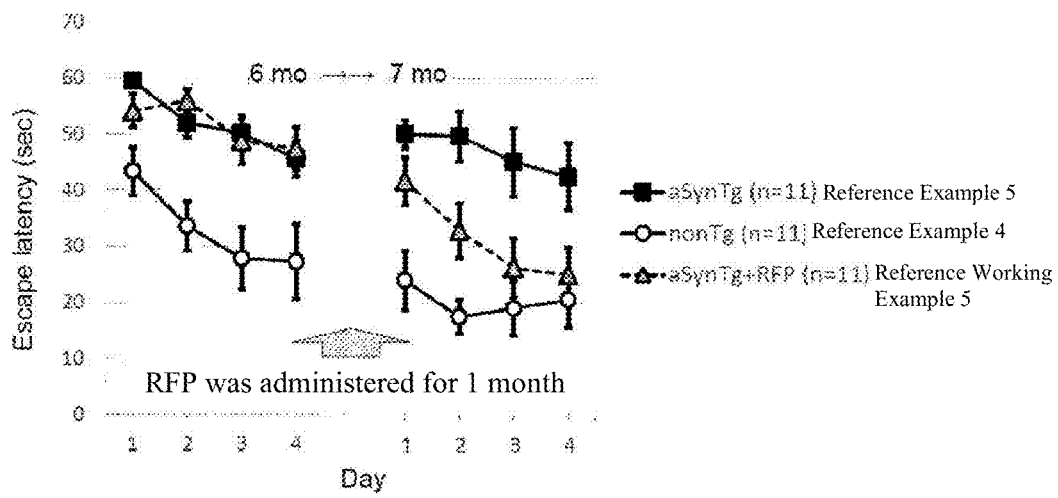
FIG. 9 shows the results of the behavioral test carried in Test Example 2, which demonstrate the effect of the administration of rifampicin on the cognitive function in mice.
Figure 11:
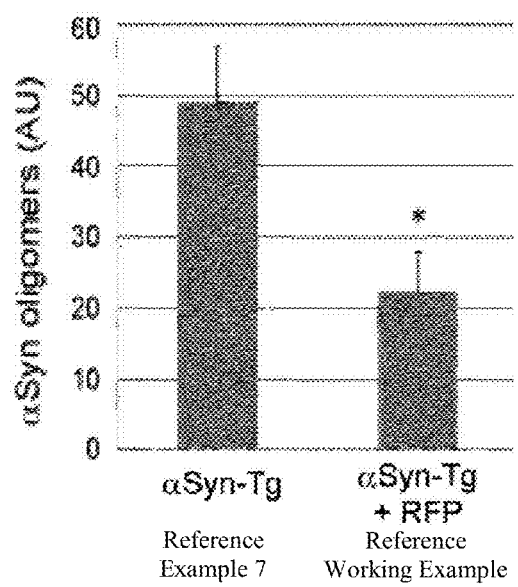
FIG. 11 shows the results of the quantification of α-synuclein based on the western blotting shown in FIG. 10.

The αSyn-Tg mice before the administration (6-month old) and after the administration (7-month old) were subjected to the behavioral test using a Morris water maze, and comparison was made with respect to the effect of rifampicin on the cognitive function of the mice. The results of the behavioral test are shown in FIG. 9. In the αSyn-Tg mice before the administration (Reference Example 5, Reference Working Example 5), memory impairment was observed. In contrast, in the αSyn-Tg mice which had undergone the transnasal administration of rifampicin (Reference Working Working Example 5) to which rifampicin had been administered transnasally, the reduction in α-synuclein oligomers was observed. The α-synuclein quantification results obtained from the western blotting shown in FIG. 10 are shown in FIG. 11. As shown in FIG. 11, in the αSyn-Tg mice (Reference Working Example 5) to which rifampicin had been administered transnasally, the α-synuclein oligomer was significantly reduced compared with the αSyn-Tg mice (Reference Example 7) which did not undergo the administration yet.

Test Example 3: Transnasal Administration of First Medicine to Alzheimer's Disease Model Mice Each of an administration composition containing rifampicin (RFP) alone, an administration composition containing resveratrol (Res) alone, an administration composition containing rifampicin and resveratrol, and an administration composition without rifampicin or resveratrol was administered to Alzheimer's disease model mice every day for 1 month at a dose and usage shown in Table 4.
(Subjects of Administration)

The same $APP_{OSK}$ mice as those used in Test Example 1 were used as subjects of administration.
(Administration Compositions)

In a 0.5-w/v % aqueous sodium carboxymethylcellulose (CMC; Sigma-Aldrich, Carboxymethylcellulose sodium salt low viscosity, C5678) solution (also referred to as "CMC", hereinafter) was suspended rifampicin drug (RFP; Sigma-Aldrich, Rifampicin ≥97% (HPLC), powder, another name: 3-(4-methylpiperazinyliminomethyl)rifamycin SV, rifampicin AMP, rifampin, R3501) and/or resveratrol (Res; FUJIFILM Wako Pure Chemical Corporation, ≥98% (HPLC), another name: 3,5,4'-trihydroxy-trans-stilbene) in such a blend amount that each of the doses shown in Reference Example 10, Comparative Example 1 and Example 1 in Table 4 could be achieved. In this manner, administration compositions were prepared. With respect to Reference Examples 8 to 9, administration compositions were prepared in the same manner as mentioned above, except that both of the rifampicin drug and resveratrol were not contained.
(Administration Method)

Transnasal administration was carried out in the same manner as in Test Example 1.

fact, the cognitive function-improving effect achieved when the rifampicin and resveratrol were used in combination (Example 1) was remarkable beyond the level that was predicted as the sum total of the effect achieved by administering rifampicin alone and the effect achieved by administering resveratrol alone (Comparative Example 1, Reference Example 10).
(Result 2—Immunohistochemical Staining (Brain Pathology))

Figure 13:
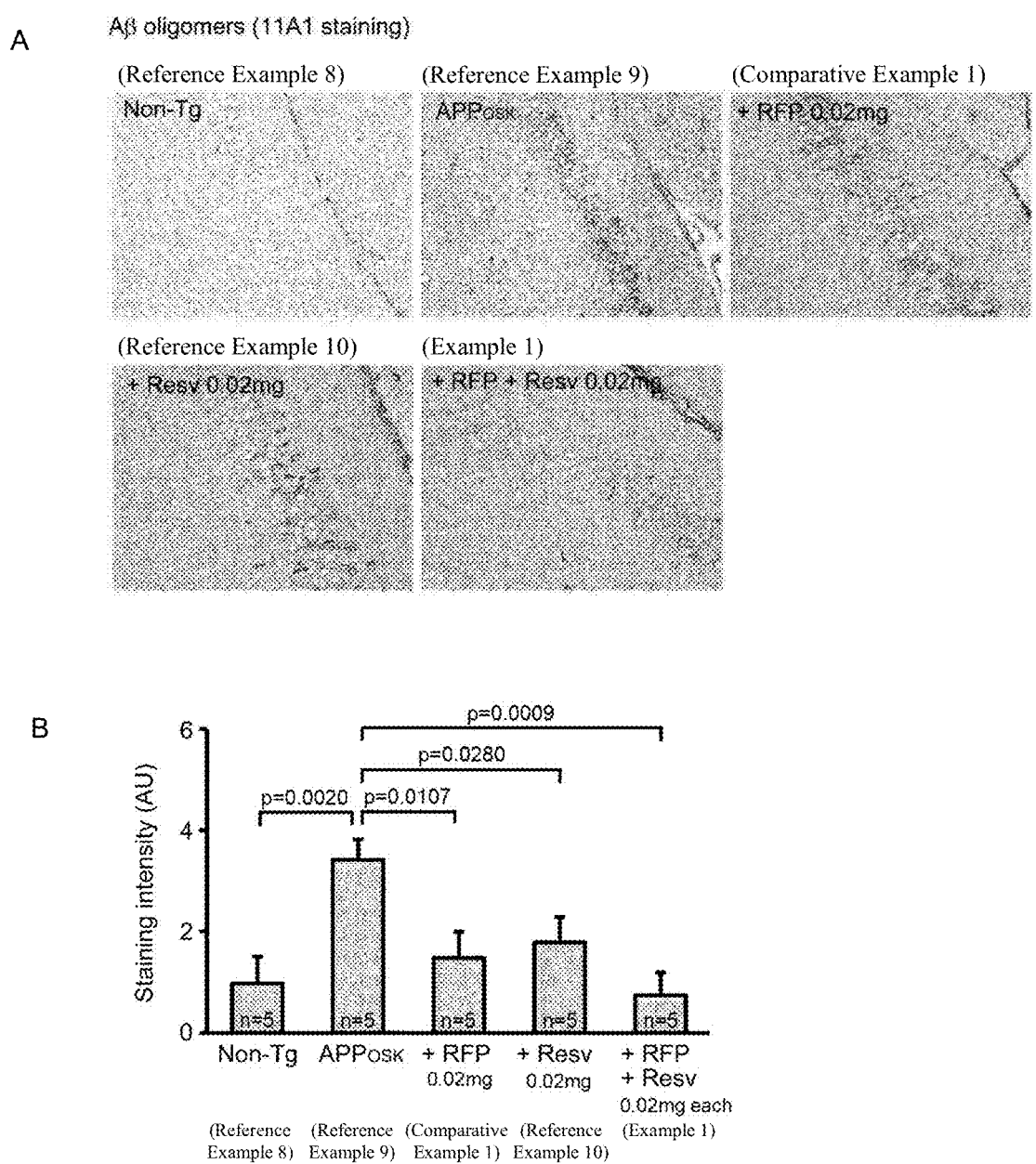
FIG. 13 shows the results of the immunostaining carried out in Test Example 3, which demonstrate the Aβ oligomer removing effect by rifampicin (in combination with resveratrol). (A) Immunostaining images. (B) Quantification of staining intensities.

In the same manner as in Test Example 1, comparison was made with respect to the effect of rifampicin on Aβ oligomers by immunohistochemical staining. The results are shown in FIG. 13(a). The results obtained by showing the staining intensities in FIG. 13(a) graphically are shown in FIG. 13(b). As shown in these results, the accumulation of Aβ oligomers was not observed in the normal Non-Tg mice (Reference Example 8), while the accumulation of Aβ oligomers was observed in the $APP_{OSK}$ mice (Reference Example 9) to which rifampicin had not been administered. In each of the $APP_{OSK}$ mice (Comparative Example 1) to which 0.02 mg of rifampicin had been administered and the $APP_{OSK}$ mice (Reference Example 10) to which 0.02 mg of resveratrol had been administered, the effect to remove the accumulated Aβ oligomers was observed, but the level of the effect was smaller than that in Example 1 mentioned below. In contrast, in the $APP_{OSK}$ mice (Example 1) to which rifampicin had been administered in combination with resveratrol, it was demonstrated that accumulated Aβ oligomers was fully removed.
(Result 3—Hepatic Dysfunction)

In the same manner as in Test Example 1, comparison was made among the mice of Reference Example 8 to 10, Comparative Example 1 and Example 1 with respect to the

TABLE 4

|  | Reference Example 8 | Reference Example 9 | Comparative Example 1 | Reference Example 10 | Example 1 |
| --- | --- | --- | --- | --- | --- |
| Dose/day | 10 µl CMC | 10 µl CMC | RFP 0.02 mg/ 10 µl CMC | Res 0.02 mg/ 10 µl CMC | RFP 0.02 mg + Res 0.02 mg/ 10 µl CMC |
| Usage | Transnasal | Transnasal | Transnasal | Transnasal | Transnasal |
| Subject of administration | Non-Tg (wild type) | $APP_{OSK}$ | $APP_{OSK}$ | $APP_{OSK}$ | $APP_{OSK}$ |

(Result 1—Behavioral Test (Cognitive Function))

In the same manner as in Test Example 1, the mice of Reference Example 8 to 11, Comparative Example 1 and Example 1 were subjected to the test using a Morris water maze. The results are shown in FIG. 12. Compared with the $APP_{OSK}$ mice (Reference Example 9) to which rifampicin had not been administered, in the $APP_{OSK}$ mice (Comparative Example 1) to which 0.02 mg of rifampicin had been administered, the cognitive function improving tendency was observed. Compared with the $APP_{OSK}$ mice (Reference Example 9) to which rifampicin had not been administered, in the $APP_{OSK}$ mice (Reference Example 10) to which 0.02 mg of resveratrol had been administered, the cognitive function improving tendency was observed. In contrast, in the $APP_{OSK}$ mice (Example 1) to which rifampicin had been administered in combination with resveratrol, the cognitive function was significantly improved, in which the improvement was at the same level as that achieved in the normal Non-Tg mice (Reference Example 8). That is, when each of rifampicin and resveratrol was administered alone (Comparative Example 1, Reference Example 10), there was not significant different in cognitive function. In view of this levels of hepatic dysfunction by rifampicin on the basis of the AST measurement results. The results are shown in FIG. 14.

Figure 14:
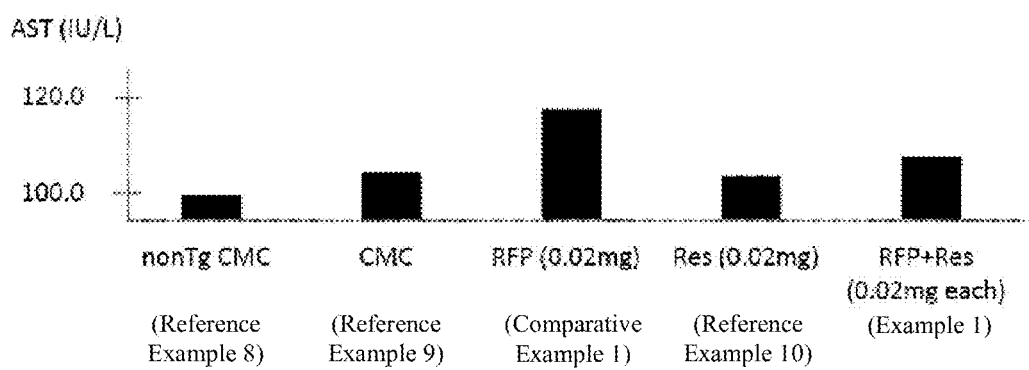
FIG. 14 shows the results of the measurement of AST which is carried out in Test Example 3, which demonstrate the level of hepatic dysfunction caused the administration of rifampicin (in combination with resveratrol).

As shown in FIG. 14, in the normal Non-Tg mice (Reference Example 8) and the $APP_{OSK}$ mice (Reference Example 9) to which rifampicin had not been administered, the increase in AST level, which indicated the occurrence of adverse side effects by hepatic dysfunction, was not observe. In contrast, in the $APP_{OSK}$ mice (not shown) to which 0.1 mg of resveratrol had been administered alone, the AST level was decreased and a positive liver protection activity was confirmed compared with the $APP_{OSK}$ mice (Reference Example 9) to which rifampicin had not been administered. In contrast, in the $APP_{OSK}$ mice (Reference Example 10) to which 0.02 mg of resveratrol was administered alone, the dose of resveratrol was too small and therefore AST was not reduced.

As shown in FIG. 14, in the $APP_{OSK}$ mice (Comparative Example 1) to which 0.02 mg of rifampicin had been administered alone, the increase in AST level, which indicated the occurrence of adverse side effects, was observed. As shown in Test Example 1 above, the increase in AST level in Comparative Example 1 was significantly reduced compared with the case of oral administration and was also reduced compared with Reference Working Example 3 in which 0.05 mg had been administered. However, in the APP$_{OSK}$ mice (Example 1) in which rifampicin had been administered in combination with resveratrol, AST was reduced to a level close to that in the APP$_{OSK}$ mice (Reference Example 9) to which rifampicin had not been administered. Furthermore, although the dose of resveratrol combined with rifampicin in Example 1 was as small as the dose in Reference Example 10 in which any effective liver protection activity was not observed using resveratrol alone (actually, when compared with Reference Example 9 in FIG. 14, AST was not reduced in Reference Example 10), an effective liver protection activity was observed when resveratrol was administered in combination with rifampicin. In addition, in the APP$_{OSK}$ mice (not shown) in which 0.1 mg of resveratrol had been administered alone and the positive liver protection activity had been observed, the AST level was about 86 IU/L. The degree of reduction of the AST level in Example 1 relative to the AST level in Reference Example 9 (i.e., liver protection activity achieved when 0.02 mg of resveratrol was administered in combination) was equivalent to the degree of reduction of the AST level achieved when 0.1 mg of resveratrol was administered relative to the AST level in Comparative Example 1 (i.e., liver protection activity achieved when 0.1 mg of resveratrol had been administered alone). In view of this fact, it was concluded that the adverse side effect reduction effect by resveratrol combined with rifampicin was extremely remarkable.

Test Example 4: Transnasal Administration of First Medicine to Synucleinopathy Model Mice Each of administration compositions each containing or not containing rifampicin and resveratrol was administered to synucleinopathy model mice shown in Table 5 every day for 1 month at a dose and usage shown in Table 5.
(Subjects of Administration)
Seven-month-old (7 mo) individuals of the synucleinopathy model mice ([A53T]αSyn-Tg) described in Test Example 2 were used as subjects of administration. The mice were models for dementia with Lewy bodies (DLB) which had no motor function abnormality and had deteriorated cognitive function.
(Administration Compositions)
In a 0.5-w/v % aqueous sodium carboxymethylcellulose (CMC; Sigma-Aldrich, Carboxymethylcellulose sodium salt low viscosity, C5678) solution (also referred to as "CMC", hereinafter) were suspended rifampicin drug (RFP; Sigma-Aldrich, Rifampicin ≥97% (HPLC), powder, another name: 3-(4-methylpiperazinyliminomethyl)rifamycin SV, rifampicin AMP, rifampin, R3501) and resveratrol (Res; FUJIFILM Wako Pure Chemical Corporation, ≥98% (HPLC), another name: 3,5,4'-trihydroxy-trans-stilbene) in such a blend amount that each of the doses shown in Reference Examples 2 and 3 in Table 5 could be achieved. In this manner, administration compositions were prepared. With respect to Reference Examples 11 and 12, administration compositions were prepared in the same manner as mentioned above, except that both of the rifampicin drug and resveratrol were not contained.
(Administration Method)
Nasal administration was carried out in the same manner as in Test Example 1.

TABLE 5

| | Reference Example 11 | Reference Example 12 | Example 2 | Example 3 |
|---|---|---|---|---|
| Dose/day | 10 µl CMC | 10 µl CMC | RFP 0.02 mg + Res 0.02 mg/ 10 µl CMC | RFP 0.01 mg + Res 0.01 mg/ 10 µl CMC |
| Usage | Transnasal | Transnasal | Transnasal | Transnasal |
| Subject of administration | Non-Tg (wild type) | αSyn-Tg 7 mo (DLB) | αSyn-Tg 7 mo (DLB) | αSyn-Tg 7 mo (DLB) |

Figure 15:
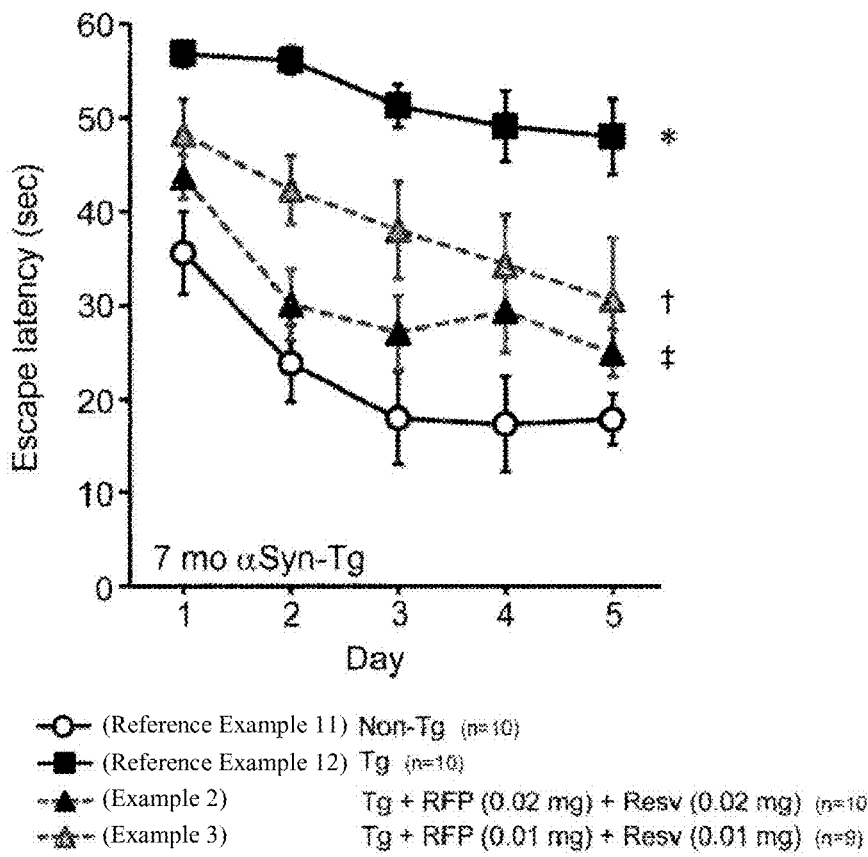
FIG. 15 shows the results of the behavioral test carried out in Test Example 4, which demonstrate the effect of the administration of rifampicin (in combination with resveratrol) on the cognitive function in synucleinopathy model mice.

(Result—Behavioral Test (Cognitive Function))
In the same manner as in Test Example 1, the mice of Reference Examples 11 and 12 and Examples 1 and 2 were subjected to the test using a Morris water maze. The results are shown in FIG. 15. In the synucleinopathy model mice (Reference Example 12) to which a combination preparation of rifampicin and resveratrol had not been administered, the cognitive function improving tendency was small. In contrast, in the synucleinopathy model mice (Examples 2 and 3) to which a combination preparation of rifampicin and resveratrol had been administered, the cognitive function improving tendency was observed significantly and the improvement of cognitive function at a level close to the level observed in the wild-type mice (Reference Example 11) was observed. Furthermore, as apparent from the comparison between Example 2 and Example 3, it was confirmed that the cognitive function improving effect by the combination preparation of rifampicin and resveratrol had dose-either dependency.

Test Example 5: Transdermal Administration of First Medicine to Tauopathy Model Mice Each of administration compositions each containing or not containing rifampicin and resveratrol was administered to synucleinopathy model mice shown in Table 6 every day for 1 month at a dose and usage shown in Table 6.
(Subjects of Administration)
Tauopathy model mice (Umeda T et al., Am. J. Pathol. 183, 211-225, 2013) were provided, 14- to 15-month-old individuals of the model mice were used as subjects of administration.
(Administration Compositions)
In a 0.5-w/v % aqueous sodium carboxymethylcellulose (CMC; Sigma-Aldrich, Carboxymethylcellulose sodium salt low viscosity, C5678) solution (also referred to as "CMC", hereinafter) was suspended rifampicin drug (RFP; Sigma-Aldrich, Rifampicin ≥97% (HPLC), powder, another name: 3-(4-methylpiperazinyliminomethyl)rifamycin SV, rifampicin AMP, rifampin, R3501) and/or resveratrol (Res; FUJIFILM Wako Pure Chemical Corporation, ≥98% (HPLC), another name: 3,5,4'-trihydroxy-trans-stilbene) in such a blend amount that each of the doses shown in Comparative Examples 2, Reference Example 15, Example 4 and Example 5 in Table 6 could be achieved. In this manner, administration compositions were prepared. With respect to Reference Examples 13 to 14, administration compositions were prepared in the same manner as mentioned above, except that both of the rifampicin drug and resveratrol were not contained.

the effect was exerted when resveratrol was administered at a dose of 0.1 mg to the Alzheimer's disease models. More specifically, the results obtained when each of administration compositions each containing resveratrol alone or not containing resveratrol was administered to the Alzheimer's disease model mice shown in Table 7 at a dose and usage shown in Table 7 every day for 1 month are shown.

TABLE 6

|  | Reference Example 13 | Reference Example 14 | Comparative Example 2 | Reference Example 15 | Example 4 | Example 5 |
|---|---|---|---|---|---|---|
| Dose/day | 10 µl CMC | 10 µl CMC | RFP 0.02 mg/ 10 µl CMC | Res 0.02 mg/ 10 µl CMC | RFP 0.02 mg + Res 0.02 mg/ 10 µl CMC | RFP 0.01 mg + Res 0.01 mg/ 10 µl CMC |
| Usage | Transnasal | Transnasal | Transnasal | Transnasal | Transnasal | Transnasal |
| Subject of administration | Non-Tg (wild type) | Tau784 14-15 mo | Tau784 14-15 mo | Tau784 14-15 mo | Tau784 14-15 mo | Tau784 14-15 mo |

(Result—Behavioral Test (Cognitive Function))

Figure 16:
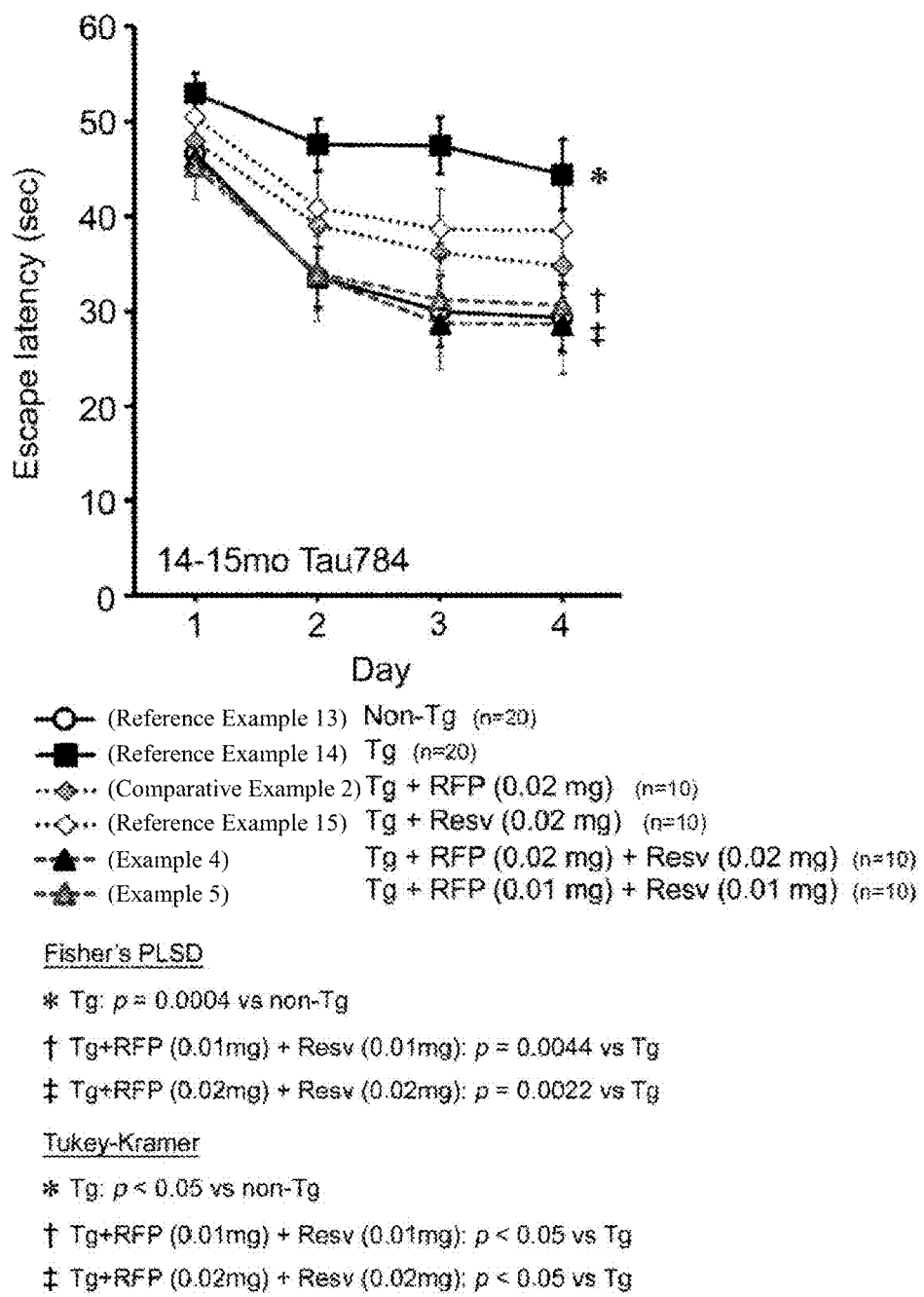
FIG. 16 shows the results of the behavioral test carried out in Test Example 5, which demonstrate the effect of administration of rifampicin (in combination with resveratrol) on the cognitive function in tauopathy model mice.

In the same manner as in Test Example 1, the mice of Reference Examples 13 to 15, Comparative Example 2 and Examples 4 to 5 were subjected to the test using a Morris water maze. The results are shown in FIG. 16. In the tauopathy model mice (Reference Example 14) to which both of rifampicin and resveratrol had not been administered, the cognitive function improving tendency was small. In the tauopathy model mice (Comparative Example 2 and Reference Example 15) to which a rifampicin single agent or a resveratrol single agent had been administered, the cognitive function improving effect was developed slowly. Referring to these facts, in the tauopathy model mice (Examples 4 and 5) to which a combination preparation of rifampicin and resveratrol had been administered, the tendency of improvement of cognitive function was observed significantly, and the improvement of cognitive function was observed to a level equivalent to that in the wild-type mice (Reference Example 13). In Example 5 in which the total amount of rifampicin and resveratrol was 0.02 mg, a significant cognitive function improving effect was achieved compared with Comparative Example 2 or Reference Example 15 to which rifampicin or resveratrol had been administered alone at a dose of 0.02 mg. From these facts, it was concluded that the cognitive function-improving effect achieved by the combination of rifampicin and resveratrol (Example 5) was remarkable beyond the level that was predicted as the sum total of the effect achieved by administering rifampicin alone and the effect achieved by administering resveratrol alone (Comparative Example 2, Reference Example 15).

Test Example 6: Transnasal Administration of Second Medicine to Alzheimer's Disease Model Mice As shown in Reference Example 10 in FIG. 12 and Reference Example 15 in FIG. 16, when 0.02 mg of resveratrol was administered alone to the mice for 1 month, a slow cognitive function-improving effect on a neurodegenerative disease was observed. As shown in Reference Example 10 in FIG. 13(*a*) and FIG. 13(*b*), the fact that this effect was exerted surely although the effect was exerted slowly was demonstrated by the fact that the accumulated Aβ oligomers removing effect was confirmed when 0.02 mg of resveratrol was administered alone to the mice for 1 month. In this Test Example, it was also demonstrated that (Subjects of Administration)

Thirteen-month-age (13 mo) individuals of the APP$_{OSK}$ mice shown in Test Example 1 were used.

(Administration Compositions)

In a 0.5-w/v % aqueous sodium carboxymethylcellulose (CMC; Sigma-Aldrich, Carboxymethylcellulose sodium salt low viscosity, C5678) solution (also referred to as "CMC", hereinafter) was suspended resveratrol (Res; FUJIFILM Wako Pure Chemical Corporation, ≥98% (HPLC), another name: 3,5,4'-trihydroxy-trans-stilbene) in such a blend amount that each of the doses shown in Examples 6 and 7 in Table 7 could be achieved. In this manner, administration compositions were prepared. With respect to Reference Examples 16 and 17, administration compositions were prepared in the same manner as mentioned above, except that resveratrol was not contained.

(Administration Method)

Transnasal administration was carried out in the same manner as in Test Example 1.

TABLE 7

|  | Reference Example 16 | Reference Example 17 | Example 6 | Example 7 |
|---|---|---|---|---|
| Dose/day | 10 µl CMC | 10 µl CMC | Res 0.02 mg/ 10 µl CMC | Res 0.1 mg/ 10 µl CMC |
| Usage | Transnasal | Transnasal | Transnasal | Transnasal |
| Subject of administration | Non-Tg (wild type) | APP$_{OSK}$ | APP$_{OSK}$ | APP$_{OSK}$ |

(Result—Behavioral Test (Cognitive Function))

Figure 17:
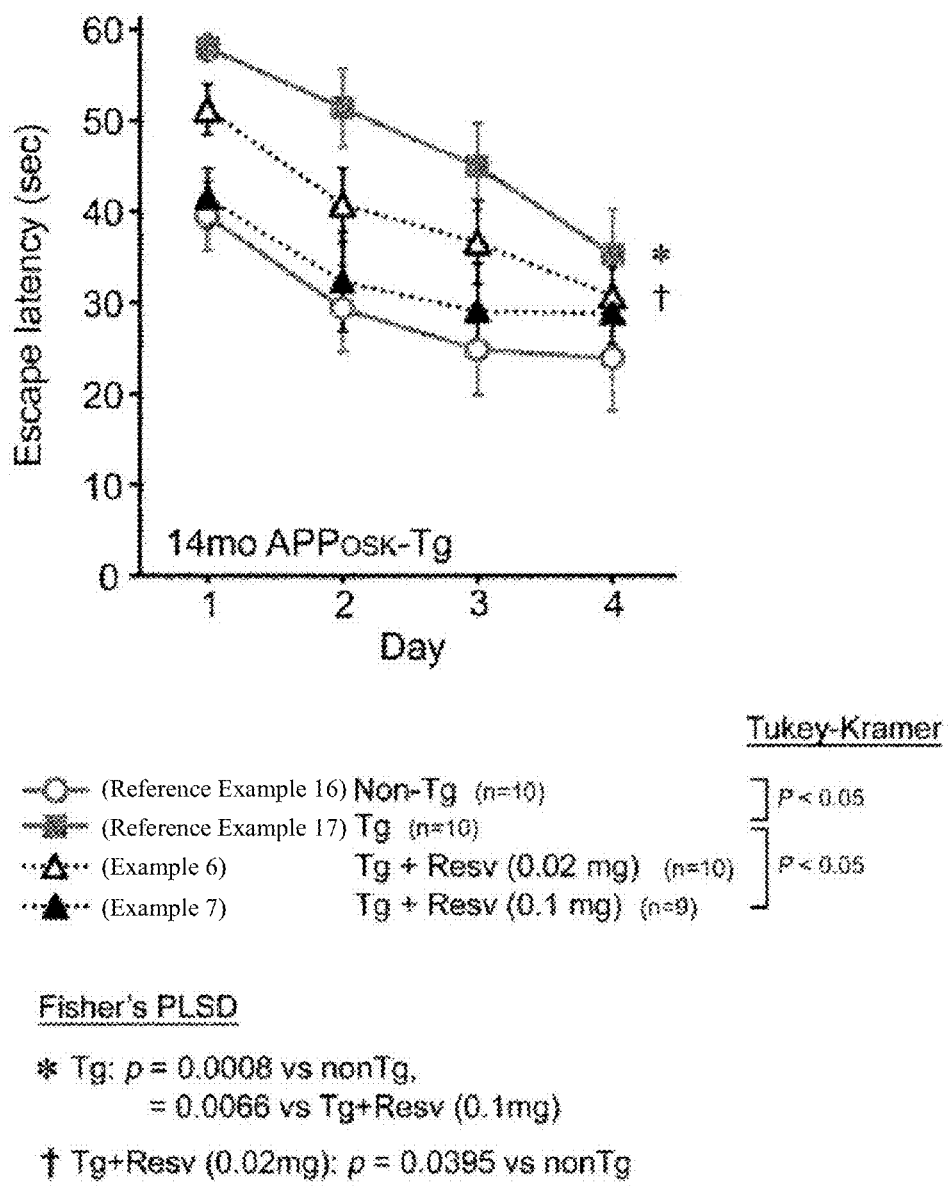
FIG. 17 shows the results of the behavioral test carried out in Test Example 6, which demonstrate the effect of administration of resveratrol on the cognitive function in Alzheimer's disease model mice.

In the same manner as in Test Example 1, the mice in Reference Examples 16 and 17 and Examples 6 and 7 were subjected to the test using a Morris water maze. The result are shown in FIG. 17. Compared with the cognitive function improving effect exerted in the Alzheimer's disease model mice (Reference Example 17) to which resveratrol had not been administered, in the Alzheimer's disease model mice (Examples 6, 7) to which resveratrol had been administered, the cognitive function improving effect was observed. Particularly as shown in Example 7, when resveratrol was administered at a dose of 0.1 mg/day (Example 7), the improvement of cognitive function was observed to a level close to that observed in the wild-type mice (Reference Example 16). When resveratrol was administered at a dose of 0.02 mg/day (Example 6), the cognitive function-improving effect was observed, although the effect was exerted slowly.

There were a pathological finding that the mice used in this Test Example were models which were produced so as to show the deterioration of cognitive function as the result of the accumulation of Aβ oligomers and a pathological finding that, as shown in Reference Example 10 in FIG. 13(a) and FIG. 13(b), when 0.02 mg of resveratrol alone was administered to the mice for 1 month, the significant removal of the accumulated oligomers was observed. In view of these pathological findings, the matter that cognitive function could be improved by the administration of 0.02 mg of resveratrol was obvious from the viewpoint of the mechanism thereof. Therefore, according to the mice (n=10) used in this Test Example, although the cognitive function-improving effect by 0.02 mg of resveratrol was as shown in FIG. 17, it was obvious from the viewpoint of the mechanism that the cognitive function-improving effect could be observed with a significancy as observed in the mice in Example 7.

CONCLUSIONS

As shown in the above-mentioned Examples, firstly, from the results obtained when a combination preparation of rifampicin and resveratrol was administered to the Alzheimer's disease models, the synucleinopathy model mice and the tauopathy model mice, it was confirmed that the combination preparation of rifampicin and resveratrol could reduce adverse side effects and was effective on a neurodegenerative disease at a low dose and, as a result, it was suggested that the combination preparation could be administered for a long period; and secondly, from the results obtained when a resveratrol single agent was administered to the Alzheimer's disease models, it was confirmed that a combination preparation of resveratrol was effective on a neurodegenerative disease at a low dose and, as a result, it was suggested that the combination preparation could be administered for a long period and could be taken for a long period. In fact, as shown in the above-mentioned Examples, continuous administration to the mice for a period as long as 1 month was possible.

The extrapolation of an effective amount in a mouse into an effective amount in a human body can be performed appropriately with taking the difference in size, shape and function of nose, nasal mucosa and olfactory nerve into consideration. In the above-mentioned Examples relating to the first medicine, it was demonstrated that the effect of rifampicin on mice (body weight: about 30 g) could be exerted at a lower dose of 0.02 mg/mouse/day (0.66 mg/kg·day) or 0.01 mg/mouse/day (0.33 mg/kg·day). From the obtained results, it is expected that the effect can be of course expected at a dose that is about 1/10 of these doses. Furthermore, it is also considered that the administration for a longer period would be possible. Therefore, in view of these longer-period administrations, it is expected that the effect could be exerted even at a further smaller dose (e.g., 0.001 mg/kg·day). On the other hand, in view of the fact that the preparation was formulated in such a manner that the oral dose of rifampicin to a human body became 450 to 600 mg/60 kg·day (7.5 to 10 mg/kg·day) and the fact that, in the above-mentioned Reference Working Examples, it was demonstrated that the effect was exerted by transnasal administration at a small dose, i.e., 1/12.5 of the dose for oral administration (Reference Working Example 1 in Test Example 1), it is considered that, in the administration to a human body, a dose that is 1/5 of the conventionally employed dose (e.g., 1.5 mg/kg·day) is of course effective. For these reasons, in the administration to a human body, the dose to be employed can be 0.001 to 1.5 mg/kg·day. When this dose is taken together with the dose of 0.15 to 3.75 mg/kg·day which was determined in Test Example 1, it is possible to employ a still smaller dose of 0.001 to 3.75 mg/kg·day as a dose for the administration to a human body.

In the Examples relating to the first medicine, each of the transnasal administration compositions was prepared in such a manner that rifampicin and resveratrol were contained in the same amount. Therefore, the dose of resveratrol to a human body can also be adjusted to a dose of rifampicin as determined above. Even when the dose of the resveratrol compound is 0.02 mg/mouse/day (0.66 mg/kg·day) or 0.01 mg/mouse/day (0.33 mg/kg·day) which is smaller than 0.1 mg/mouse/day (3.3 mg/kg·day) at which the positive liver protection activity can be exerted by the resveratrol compound alone and at which an effective liver protection activity cannot be exerted by the resveratrol compound alone, a significant adverse-side-effect-reducing effect can be achieved when the resveratrol compound is combined with rifampicin. In view of this fact, the dose of resveratrol to a human body can also be a further smaller value, i.e., 0.001 to 2.5 mg/kg·day.

More specifically, the extrapolation of an effective amount in a mouse into an effective amount in a human body can be performed on the basis of a human equivalent dose prescribed in FDA Guidance Document UCM078932. For example, when the conversion to a human equivalent dose based on the body surface area of a mouse is to be carried out, a divisor 12.3 is used. More specifically, a dose (mg·kg) for a mouse having a body weight of 30 g is divided by 12.3 to determine a dose (mg/kg) for a human body having a body weight of 60 kg. Based on this principle, the dose 0.02 mg/mouse/day (0.66 mg/kg·day) or 0.01 mg/mouse/day (0.33 mg/kg·day) of each of rifampicin and resveratrol for a mouse, which was employed in Examples relating to the first medicine, corresponds to a dose 0.054 mg/kg·day or 0.027 mg/kg·day, respectively, for a human body. In addition, the dose 0.02 mg/mouse/day (0.66 mg/kg·day) or 0.1 mg/mouse/day (3.3 mg/kg·day) of resveratrol for a mouse, which was employed in Examples relating to the second medicine, corresponds to a dose 0.054 mg/kg·day or 0.27 mg/kg·day, respectively, for a human body.

Furthermore, in the above-mentioned Examples, compositions for transnasal administration in each of which an aqueous sodium carboxymethylcellulose solution was used as a solvent and 1 part by weight of resveratrol was contained relative to 1 part by weight of rifampicin were prepared, and sufficient efficacy of the compositions in mice was demonstrated. As mentioned above, the extrapolation of an effective amount in a mouse into an effective amount in a human body can be performed appropriately with taking the difference in size, shape, function or the like of nose, nasal mucosa, olfactory nerve or the like into consideration. In addition, in order to facilitate the absorption of the medicinal agent in the composition for transnasal administration through the nasal mucosa, it is desirable to make the composition for transnasal administration retain in an absorption site in the nasal cavity for a long time. Therefore, it also becomes possible to consider the fact that a component having lower solubility in water is more likely to be swept away toward the digestive tract with the influence of the transfer of a mucus layer by means of the ciliated cells in the nasal cavity. The solubility of rifampicin in water is 2.5 mg/mL at 25° C., and the solubility of resveratrol in water is 0.03 mg/mL at 25° C. When the influence of this difference in solubility in water on the difference in easiness of being swept away of a medicinal agent from the nasal cavity toward the digestive tract is more significant in a human body, the content of the resveratrol compound per 1 part by weight of the rifampicin compound may be 1 to 500 parts by weight. In contrast, when the influence of this difference in solubility in water on the difference in easiness of being swept away of a medicinal agent from the nasal cavity toward the digestive tract is smaller, the content of the resveratrol compound per 1 part by weight of the rifampicin compound may be $1/500$ to 1 part by weight. These facts are taken together, and it is found that the content of the resveratrol compound per 1 part by weight of the rifampicin compound can be $1/500$ to 500 parts by weight.

In addition, in the above-mentioned Examples, the effect on a neurodegenerative disease was confirmed by administering the first medicine and the second medicine to mice for 1 month. The life of a mouse is generally believed to be about 2 to about 2.2 years. For example, in Yuichi Yamashita. et al., "Induction of prolonged natural lifespans in mice exposed to acoustic environmental enrichment"2018 years, Scientific Reports volume 8, Article number: 7909, it is described that C57BL/6J rats (male: 4, female: 4) are bred under a common experiment animal feeding environment and the average life of the rats is about 700 days (about 2 years). On the other hand, according to "WORLD HEALTH STATISTICS OVERVIEW 2019 MONITORING HEALTH FOR THE SDGs" written by World Health Organization, it is described that the life of human is about 80 years in high-income countries. When the life of the experiment animals and the life of humans are compared, it is found that about 36 to about 40 times of the life time of the experiment animals corresponds to the life time of humans. Consequently, the administration to an experiment mouse for 1 month (31 days) corresponds to the administration to a human body for about 3 years or longer. Therefore, when the first medicine and the second medicine are administered to humans, the period of administration can be preferably 2.5 years or longer, still more preferably 2.8 years or longer, further preferably 3 years or longer.

The invention claimed is:

1. A method for treating Alzheimer's disease in a patient comprising administering to the patient a pharmacological active component consisting of a combination of: a rifampicin compound selected from the group consisting of rifampicin, a derivative of rifampicin, a salt of rifampicin and a salt of a derivative of rifampicin, and a resveratrol compound selected from the group consisting of resveratrol and a derivative of resveratrol;

wherein the derivative of rifampicin is selected form the group consisting of 3-formyl-rifamycin SV, rifamycin S, rifamycin B, rifamycin SV and 25-desacetyl-rifampicin, and the derivative of resveratrol is a resveratrol having a derivative group selected from the group consisting of N-phenylacetyl group, 4,4'-dimethoxytrityl (DMT) group, protein group, peptide group, sugar group, lipid group, nucleic acid group, polystyrene group, polyethylene group, polyvinyl polyester group, and ester group.

2. The method according to claim 1, wherein the resveratrol compound is contained in an amount of $1/500$ to 500 parts by weight relative to 1 part by weight of the rifampicin compound.

* * * * *